United States Patent Office 3,116,289
Patented Dec. 31, 1963

3,116,289
20-KETO-17,21-ALKYLIDENEDIOXY STEROIDS AND PROCESSES FOR THEIR MANUFACTURE AND TRANSFORMATION
Masato Tanabe, Palo Alto, Calif., assignor to Schering Corporation, Bloomfield, N.J., a corporation of New Jersey
No Drawing. Filed Aug. 21, 1961, Ser. No. 132,543
16 Claims. (Cl. 260—239.55)

This invention pertains to novel steroidal substances and to methods for their manufacture. More particularly, it relates to the steroids wherein the dihydroxyacetone side chain of a pregnane or unsaturated pregnane is transformed into a 17,21-alkylidenedioxy function. This application is a continuation-in-part of three earlier filed applications Serial Numbers 845,594, 845,595 and 845,661, all filed on October 12, 1959, said applications now abandoned.

By far, most of the physiologically active steroids are members of the pregnane series possessing a dihydroxyacetone side chain at the C–17 position. The complete side chain in many instances is a necessary feature in order for the pregnane to possess a particular activity such as evidenced by the adrenocarticoids like cortisone, hydrocortisone, prednisone, prednisolone and the related analogs. It is well known that the dihydroxy acetone side chain is particularly reactive with oxidative, reductive, acidic and basic reagents, necessitating "blocking" during transformations performed elsewhere in the molecule. I have found that conversion of the dihydroxyacetone side chain present at the C–17 position of a pregnane or unsaturated pregnane into a 17,21-alkylidenedioxy group provides for effective deactivation of said side chain and offers several other advantages described in further detail below.

It is thus an object of my invention to provide a new series of steroid compounds of the pregnane series possessing a 20-keto-17,21-alkylidenedioxy group, said group effectively providing protection to the side chain during chemical transformation elsewhere in the molecule. It is an object of my invention to provide a method for preparing these new compounds and also provide a method for regenerating the dihydroxy side chain. An additional object provides for transforming the alkylidenedioxy compounds into substances containing an additional substituent at C–21, and also to subsequently regenerate the dihydroxy side-chain leaving the additional substituent/s at C–21 intact. Other objects will become evident from the detailed description set forth below.

I have found that when a steroid possessing the 17,21-dihydroxy-20-keto function is treated with a ketone, aldehyde, acetal or preferably a lower alkyl ketal, in the presence of a small amount of strong acid, there is formed the 17,21-alkylidenedioxy group having the structure:

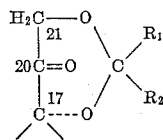

wherein $R_1$ represents hydrogen, lower alkyl and aryl and $R_2$ represents lower alkyl, aryl or together with the carbon atom to which they are attached, $R_1$ and $R_2$ form a 5–6 membered isocyclic ring.

My new process may be described as being applied to a steroid of the pregnane series having a dihydroxyacetone side chain at C–17 according to the following reaction:

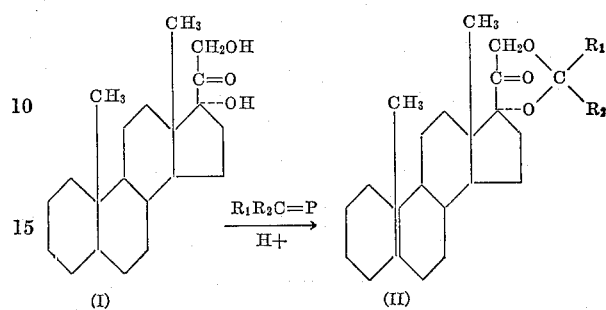

wherein $R_1$ represents hydrogen, lower alkyl and aryl and $R_2$ represents lower alkyl, aryl or together with the carbon atom to which they are attached, $R_1$ and $R_2$ form a 5–6 membered isocyclic ring, and P represents oxygen or a bis-lower alkoxy group.

By steroids of the pregnane series I refer to all compounds possessing the perhydro cyclopentanophenanthrene ring to which is attached in the 17-position the dihydroxyacetone side chain. Additional substituents such as carbonyl functions at 3 or 11; lower alkyl such as methyl at one or more of positions 2,6,16; halogen at one or more of positions 2, 4, 6, 9, 11, 12; hydroxy at one or more of positions 1, 2, 3, 11, 12; unsaturation at 1, 4, 5, 6, 7, 9; and the like may be optionally present. In fact it is by virtue of the nature of this invention that such and other additional substitution may be introduced when not present without disturbing the labile dihydroxyacetone side chain at C–17.

As the carbonyl reactant in my process, there may be employed aliphatic ketones such as acetone, methylethyl ketone, 3-pentanone and the like, cycloaliphatic ketones such as cyclohexanone, cyclopentanone and the like, aromatic ketones such as propiophenone, benzophenone and the like, aldehydes such as acetaldehyde, benzaldehyde and the like. I prefer to use the carbonyl reactant in the form of its lower alkyl acetal or ketal since I have obtained better yields and have been able to more easily separate and purify my product than when the free ketone or aldehyde of such reagents is used. Lower alkyl ketals of acetone, particularly 2,2-dimethoxypropane, are the reagents of choice.

The reaction is preferably carried out in a non-reactive, non-aqueous solvent. I prefer a polar solvent such as dimethylformamide but other solvents may be employed such as tetrahydrofuran and dioxane. The acid catalyst is preferably a strong acid such as p-toluenesulfonic acid; however, other strong acids such as sulfuric, hydrochloric or trifluoracetic may be employed. In actuality, any acid having a $-\log K$ of less than 2.25 may be employed as catalyst.

The time required to effect optimum yield of the 17,21-alkylidenedioxy group will vary depending on the temperature of reaction and reactivity of the steroid. The reaction may be followed by employing stains which are specific for the dihydroxyacetone side chain such as blue tetrazolium. Normally present functional groups or substituents elsewhere in the fused ring portion of the pregnane molecule do not interfere with the formation of the alkylidenedioxy group.

In general, my invention covers novel compounds of the pregnane series possessing the following structure at the carbon atom designated as C–17:

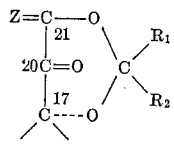

wherein $R_1$ and $R_2$ are as previously defined and Z is a member of the group consisting of $H_2$ (H, lower alkyl), (H, lower alkanoyl), (H, aralkyl), alkylidene, aralkylidene, alkylene, lower alkyl and aryl substituted alkylene.

More specifically my novel compounds may be represented as having one of the following structural formula:

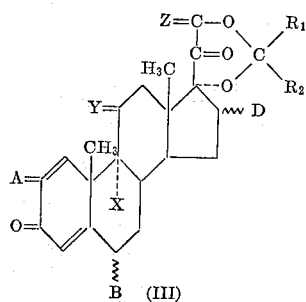

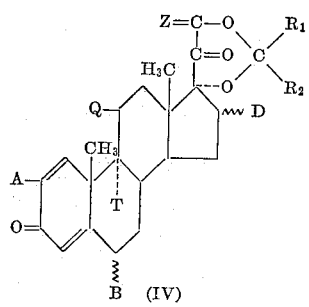

wherein $R_1$, $R_2$ and Z are as previously defined; A is a member of the group consisting of H and methyl; B is a member of the group consisting of H, methyl and halogen; D is a member of the group consisting of H, lower alkyl and lower alkylidene; X is a member of the group consisting of hydrogen and halogen; Y is a member of the group consisting of O (H,OH) and (H,O-acyl); Q and T each represent halogen; and the 1,2-dihydro analogs of the foregoing.

Typical compounds embraced by the general structural formulae, III and IV, depicted above are the following pregnadienes, as well as their 1,2-dihydro analogs and their 21-(1,2-ethylene) analogs: 9α,11β-dichloro-17α,21-isopropylidenedioxy - 1,4-pregnadiene-3,20-dione, 9α,11β-dichloro-16(α and β)-methyl-17α,21-isopropylidenedioxy-1,4-pregnadiene-3,20-dione, the 6α-methyl and the 6α-fluoro analogs of the foregoing, 9α,11β-dichloro-16-methylene - 17α,21 - isopropylidenedioxy-1,4-pregnadiene-3,20-dione, 9α,11β - difluoro - 17α,21-isopropylidenedioxy-1,4-pregnadiene-3,20-dione, its 16-methyl analogs and the 6α-methyl and 6α-fluoro analogs of the foregoing, the 9α-fluoro-11β-chloro analogs of the foregoing, the 9α-chloro-11β-fluoro analogs of the foregoing, the 9α-chloro-11β-chloro analogs of the foregoing, the 9α-chloro-17α,21-isopropylidenedioxy - 1,4 - pregnadiene-11-β-ol-3,20-dione 11β-formate; 9α-chloro-16 (α or β)-methyl-17α,21-iso- propylidenedioxy-1,4-pregnadiene - 11β-ol-3,20-dione 11β-formate; 9α - chloro-17α,21-isopropylidenedioxy-1,4-pregnadiene-11β-ol-3,20-dione 11β-acetate; 9α-bromo-17α,21-isopropylidenedioxy - 1,4-pregnadiene - 11β-ol-3,20-dione 11β-propionate; 9α - chloro-17α,21-isopropylidenedioxy-1,4-pregnadiene-11β-ol-3,20-dione 11β-diethylacetate; 9α-chloro - 16 - methylene - 17α,21-isopropylidenedioxy-1,4-pregnadiene-11β-ol-3,20-dione 11β-formate; as well as the 6α-methyl and 6α-fluoro analogs of the foregoing. Although the isopropylidenedioxy group is preferred, there also may be employed 2-butylidenedioxy, 3-pentylidenedioxy, phenyl-2-propylidenedioxy, as well as alicyclic groups such as cyclohexylidenedioxy, and the like.

Other representative examples of new pregnanes made by our process from the corresponding 17α,21-dihydroxy-20-keto-pregnanes are 17α,21-isopropylidenedioxy-4-pregnene-3,11,20-trione; 17α,21 - isopropylidenedioxy-4-pregnene-11β-ol-3,20-dione; 17α,21 - isopropylidenedioxy-1,4-pregnadiene-3,11,20-trione; 17α,21 - isopropylidenedioxy-1,4-pregnadiene-11β-ol-3,20-dione; the 9α-halogeno, especially the 9α-fluoro analogs of the foregoing; 9α-fluoro-16α - methyl-17α,21-isopropylidenedioxy-1,4-pregnadiene-11β-ol-3,20-dione; 6α-methyl-17α,21-isopropylidenedioxy-1,4-pregnadiene-11β-ol-3,20-dione; 9α-fluoro-16β-methyl-17α,21 - isopropylidenedioxy-1,4-pregnadiene-11β-ol-3,20-dione; 17α,21 - isopropylidenedioxy-4-pregnene-11α-ol-3,20-dione; 17α,21 - isopropylidenedioxyallopregnane-3,20-dione; 17α,21 - isopropylidenedioxypregnane-3-ol-20-one; 17α,21-(phenyl-2-propylidenedioxy) - 1,4 - pregnadiene-3,11,20-trione; and the like, as well as the 2-butylidenedioxy, 3-pentylidenedioxy, phenyl-2-propylidenedioxy, as well as alicyclic groups such cyclohexylidenedioxy, and the like of the foregoing.

The products are purified by extraction into an organic solvent followed by recrystallization from a suitable solvent or separation by known techniques such as chromatographic means.

Unlike other derivatives which have been employed for protection of the dihydroxyacetone side chain, such as the 17(20),20(21) - bismethylenedioxy group, 20 - semicarbazone, or the 20-ethyleneketal, my novel 17,21-alkylidenedioxy group does not involve the C–20 carbonyl. Thus this carbonyl is free to enter into or activate subsequent transformations if so desired. With the 20-keto group remaining intact, the activation of the C–21 carbon atom, apparently arising from this carbonyl group, is undisturbed. Thus in the presence of a strong base, various groups can be introduced at the 21-position. Such groups include the alkyl radicals from alkyl halides; acyl radicals from carboxylic acid esters; and alkylidene and aralkylidene groups arising from the condensation of an appropriate aldehyde or ketone followed by spontaneous dehydration. Further reaction can subsequently be accomplished once the above introduction has taken place.

Thus, for example, treatment of 17α,21-isopropylidenedioxy - 1,4 - pregnadiene - 11β-ol-3,20-dione with methyl chloride, ethyl acetate, or formaldehyde in the presence of potassium t-butoxide results in the formation of respectively, 17α,21 - isopropylidenedioxy-21-methyl-1,4-pregnadiene-11β-ol-3,20-dione; 17α,21 - isopropylidenedioxy-21-acetyl-1,4-pregnadiene-11β-ol-3,20-dione; and 17α,21-isopropylidenedioxy-21-methylene - 1,4 - pregnadiene-11β-ol-3,20-dione. The reaction of 17α,21-isopropylidenedioxy-21-methylene-1,4-pregnadiene-11β-ol-3,20-dione with diazomethane will result in the formation of 17α,21-isopropylidene-21-(1,2-ethylene) - 1,4-pregnadiene-11β-ol-3, 20-dione. Subsequent cleavage of the 17α,21-isopropylidene side chain will produce the 21-(1,2-ethylene)-1,4-pregnadiene-11β,17α,21-triol. These reactions are general for the introduction of such groups at C–21.

Thus my novel process provides a method for preparing a new group of compounds of the pregnane series having further substituents C–21. These new compounds are valuable in the treatment of inflammatory diseases and have physiological effects similar to the C–21 unsubstituted analogs.

The protective grouping described heretofore may also be utlized with modification in reactions wherein strongly basic conditions are required but where reaction at C–21 is to be avoided. For example, in the alkylation leading to the formation of 2-methylprednisolone, the dihydroxyacetone side chain is protected by formation of the 17α,21-alkylidenedioxy function as heretofore described. Subsequent formation of 21-benzylidene-17α,21-alkylidenedioxy compound by treatment with benzaldehyde eliminates the possibility of any further alkylation. Hence with such two-fold protection even in such strongly basic media as potassium in liquid ammonia, alkylations may be executed without fear of attack on the C–17 side chain. The 21-benzylidene group specifically has the additional advantage of being cleaved simultaneously with the cleaving of the 17α,21-alkylidenedioxy blocking group by refluxing in strong aqueous acid, with the result that the original dihydroxyacetone side chain is regenerated.

As an alternative, the reactivity at C–21 may be lowered by merely reducing the C–20 carbonyl group to hydroxyl. Strongly basic reactions may then be executed without fear of simultaneous reactions taking place at C–21. Later reactions at C–21 are made possible by merely oxidizing the C–20 hydroxyl back to a carbonyl group. It is thus possible to selectively introduce the same or different groups at various positions in the steroid nucleus as for example preparing 2,21-dimethyl-cortisone or 6α-methyl-21-acetylprednisone.

While the 17α,21-alkylidenedioxy function can be cleaved by refluxing in aqueous acid such as 50% aqueous acetic acid or 50% formic acid, it is stable in the presence of small quantities of strong acid. Thus, for example, the 17α,21-isopropylidenedioxy group is not cleaved during the reaction of a 17α,21-dihydroxy 3-ketopregnene and ethylene glycol to form the 3-ethylene ketal in the presence of small amounts of p-toluenesulfonic acid.

The 17α,21-alkylidenedioxy function is also highly advantageous in protecting the side chain during the oxidation of various hydroxy groups in the nucleus. For example, in converting an 11β-hydroxy to an 11-keto group in a compound wherein the cortical side chain is present, simple esterification will protect a 21-hydroxyl, since the 11β-hydroxyl is difficult to esterify and little danger exists of the 11β,21-diester forming. In the case of the 11α-hydroxy epimer however, esterification readily takes place at both the 11 and 21-hydroxyl and hence selective means must be employed, as for example the use of only one equivalent of the esterifying agent. This complicating feature is obviated however with the use of 17α,21-alkylidene function.

The 17α,21-alkylidenedioxy function also serves as an effective blocking group for performing dehydrohalogenation reactions. Thus pregnane-11β,17α,21-triol-3,20-dione is converted to the corresponding 17α,21-isopropylidenedioxy compound and then brominated under basic conditions as for example bromine and sodium acetate in acetic acid. The compound thus prepared, 2,4-dibromo-17α,21-isopropylidenedioxypregnane-11β-ol-3,20-dione, is next treated with dimethylformamide yielding the corresponding 1,4-pregnadiene which when subjected to the action of refluxing 50% acetic acid is converted to prednisolone.

My novel blocking group is also well suited for executing certain oxidative conversions. Thus when subjecting the 17α,21-isopropylidenedioxy derivative of 5(6)-pregnene-3β,17α,21-triol-20-one to the action of chromium trioxide in pyridine, there is formed 17α,21-isopropylidenedioxy-4-pregnene-3,20-dione which may be cleaved by the action of acetic acid to yield Reichstein's Compound S.

The 17α,21-alkylidenedioxy function is particularly valuable in protecting the dihydroxyacetone side chain of a pregnane during an Oppenauer oxidation. For example, treatment of 17α,21-isopropylidenedioxy-5-pregnene-3β-ol-11,20-dione with aluminum isopropoxide in cyclohexanone results in the formation of 17α,21-isopropylidenedioxy-4-pregnene-3,11,20-trione, which upon cleavage in the prescribed manner yields cortisone.

The requisite starting materials of the compounds of Formula III wherein Z represents H, are prepared according to the methods in the art including U.S. Patent No. 2,986,574. Those intermediates wherein Z represents some group other than hydrogen are prepared according to methods hereinafter exemplified. According to these procedures a 7α-21-alkylidenedioxy compound may be substituted in the 21-position by virtue of the C–20 keto group which apparently activates the carbon atom at the 21-position. By employing a 17α,21-alkylidenedioxy-3,20-diketo-1,4,9(11)-pregnatriene or 4,9(11)-pregnadiene in my process there may be introduced in the 21-position an alkyl, alkylidene, aralkyl, aralkylidene, or an acyloxy group. These 21-substituted dienes and trienes possessing the 17α,21-alkylidenedioxy function are then readily converted to the corresponding 17α,21-diol by cleavage of the alkylidenedioxy group with for example 50% formic acid. The 9α-halogeno-11β-acyloxy function is then introduced by methods described in the art.

Those compounds of our invention wherein D in Formulae III and IV represents alkylidene are prepared from the corresponding 16-alkylidene-1,4,9(11)-pregnatriene-17α,21-diol-3,20-diones and 16-alkylidene-4,9(11)-pregnadiene-17α,21-diol-3,20-diones (in which the additional substitution at C–2 and C–6 as shown in Formula IV may be optionally present). These 16-alkylidene compounds are prepared according to the methods described in U.S. application, Serial No. 861,211 filed December 22, 1959. This process in brief is as follows:

By treating 16-methyl-5,16-pregnadiene-3β-ol-20-one with hydrogen peroxide there is prepared 16β-methyl-16,17-oxido-5-pregnene-3β-ol-20-one. This compound is then esterified so as to form for example the 3-acetate and then treated with hydrogen bromide in acetic acid to cleave the 16,17-oxido ring. The product thus formed, 16-methylene-5-pregnene-3β,17α-diol-20-one 3-acetate is next converted to the corresponding 3,21-diacetate through bromination at 21, conversion to the 21-iodo compound and treatment with potassium acetate to yield 16-methylene-5-pregnene-3β,17α,21-triol-20-one 3,21-diacetate. Conversion of the 3-acetoxy-Δ⁵⁽⁶⁾-system to the 3-keto-Δ⁴-system is then effected by the microbiological action of a culture of Flavobacterium dehydrogenans var. hydrolyticum and introduction of the 11β-hydroxy group by the action of the microorganism Curvularia lunata. The compound obtained after these two successive microbiological transformations is 16-methylenehydrocortisone, which is readily converted to 16-methyleneprednisolone by subjecting it to the dehydrogenating action of the microorganism Bacillus sphaericus.

Reacetylation of the 21-hydroxy group of these two compounds followed by dehydration with p-toluenesulfonyl chloride then forms respectively 16-methylene-4,9(11)-pregnadiene-17α,21-diol-3,20-dione 21-acetate and 16-methylene-1,4,9(11)-pregnatriene-17α,21-diol-3-20-dione 21-acetate.

The foregoing method for the preparation of the aforementioned 16-methylene compounds and the compounds disclosed therein are specifically disclaimed herein.

Hydrolysis of the 16-methylene-4,9(11)-pregnadiene-17α,21-diol-3,20-dione 21-acetate and corresponding 1,4,9(11)-pregnatrienes may then be effected by known methods to obtain the corresponding free 21-hydroxyl compounds. Introduction of the 9α-halogeno, 11β-acyloxy and 17α,21-alkylidenedioxy functions are then executed as described above. Similarly the various 21-substituents described herein may be introduced according to the methods also recited herein. These reactions may be summarized as follows wherein the 16-alkylidene group is exemplified below by methylene and wherein the substituents A, B and Z are as described heretofore

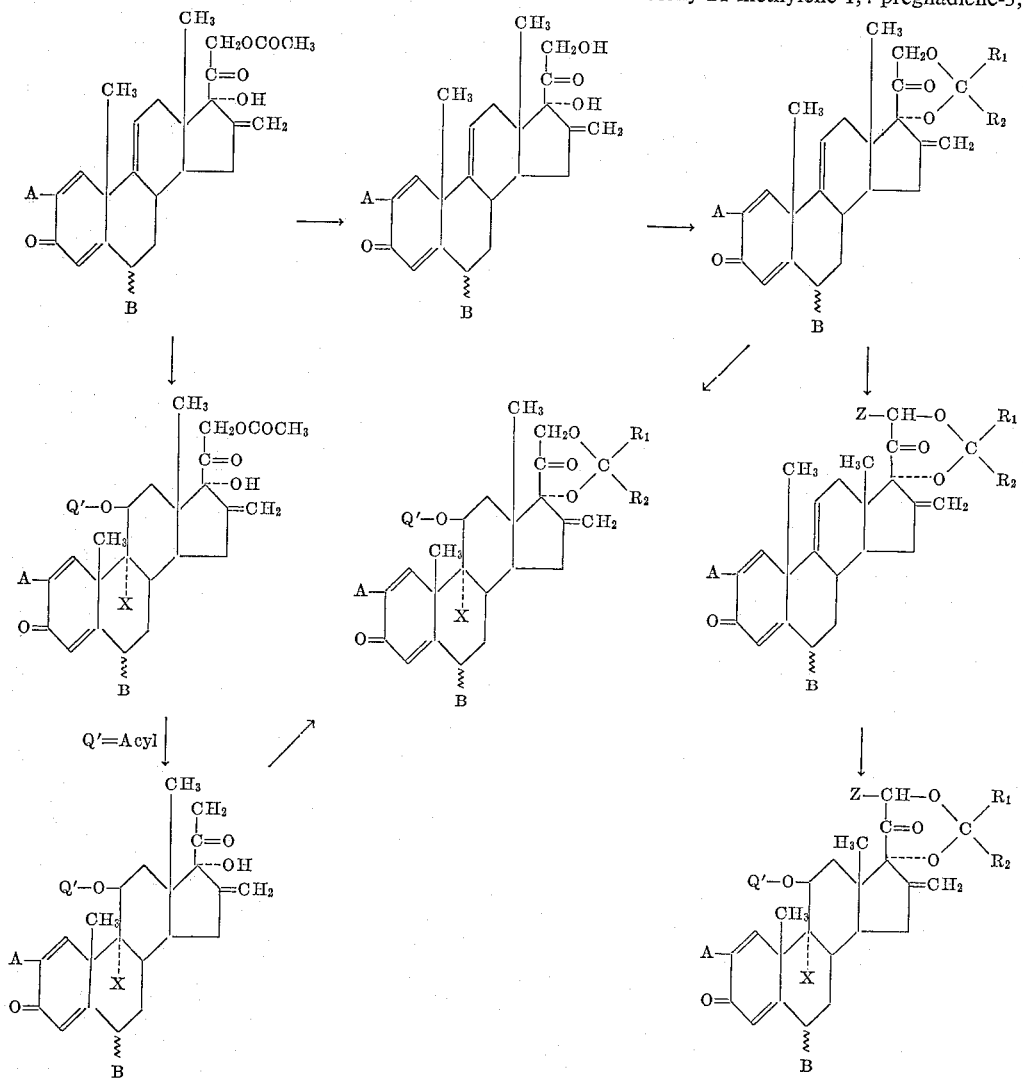

These 16-methylene-4,9(11)-pregnadienes and 16-methylene-1,4,9(11)-pregnatrienes are the precursors for novel compounds included within the scope of my invention. By subjecting for example 16-methylene-1,4,9(11)-pregnatriene-17α,21-diol-3,20-dione 21-acetate to the 9,11-di-halogenation procedures described herein, for example, the dichlorination process, there is obtained 9α,11β-dichloro-16-methylene-1,4-pregnadiene - 17α,21-diol-3,20-dione 21-acetate. Saponification of this compound yields the corresponding free 21-alcohol which when treated with 2,2-dimethoxypropane in the presence of acid catalyst yields 9α,11β-dichloro-16-methylene-17α,21-isopropylidenedioxy-1,4-pregnadiene-3,20-dione.

The requisite steroid starting materials for the compounds of Formula IV and shown in the foregoing reaction are prepared as described in U.S. Patent No. 2,894,963.

The novel 9a,11β-dihalo compounds also form a basis for preparing higher homologs and derivatives attached to C-21. The 17,21-alkylidenedioxy function permits further reaction such as additional substitution at C-21 to take place without destruction of the side chain. In view of its adjacency to the 20-keto group, the C-21 carbon atom may be further reacted under appropriate conditions which maintain the alkylidenedioxy group intact. For example, reaction of 9α, 11β-dichloro-17α,21-isopropylidenedioxy-1,4-pregnadiene-3,20-dione with formaldehyde in the presence of sodium bicarbonate results in the formation of 9α,11β-dichloro-17,21-isopropylidenedioxy-21-methylene-1,4-pregnadiene-3,20-dione. The 21-methylene group may be reduced to methyl by means known to selectively reduce such a conjugated double bond without affecting the keto groups present. Alternatively, the 17α,21-alkylidenedioxy compound may be alkylated with a methyl halide to give rise to a 21-methyl-17,21-alkylidenedioxy compound. Similarly, the 21-position of our novel compounds may be acylated with an appropriate agent to produce the 21-acyl product. For example 9α,11β - dichloro - 16α - methyl-17,21-isopropylidenedioxy-1,4-pregnadiene-3,20-dione upon reaction with ethyl acetate in the presence of base gives rise to 9α,11β-dichloro-17α,21-isopropylidenedioxy - 21 - acetyl-1,4-pregnadiene-3,20-dione, i.e., 21-substituted compounds are themselves therapeutically active in the same areas of medication for which the 21-unsubstituted compounds are useful. In each instance, the alkylidenedioxy group may be cleaved by means of acid or base giving rise to the original starting steroid which now possesses a further substituent at C-21.

It is apparent from the foregoing that a wide variety of reactions may be carried out upon pregnanes whose dihydroxy-acetone side chains are protected by my novel 17α,21-alkylidenedioxy function. These reactions include epoxide ring openings, saponifications, brominations, dehydrohalogenations, alkylations, oxidations, reductions, ring closures, and the like. In addition, merely by refluxing the reaction product in aqueous formic or aqueous acetic acid, there is regenerated the undisturbed dihydroxy-acetone side chain.

In addition to its value as a protective group for executing synthetic or degradative reactions elsewhere in the steroid molecule as described above, the presence of the 17,21-alkylidenedioxy function also enhances the effectiveness of various steroids which exhibit therapeutic activity. Thus the 17,21-isopropylidenedioxy derivative of 9α-fluoro - 16α - methyl 1,4-pregnadiene-11β,17α,21-triol-3,20-dione shows prolonged and enhanced anti-inflammatory activity and is particularly valuable in topical therapy of inflammatory conditions. The new 9,11-dihalogeno compounds and the 9α-halogeno-11β-acyloxy pregnenes of my invention falling within the general Formulae III and IV are strong anti-inflammatory agents which advantageously are not salt retaining. In particular, 9α,11β-dichloro-16α - methyl - 17,21 - isopropylidenedioxy-1,4-pregnadiene-3,20-dione is about 10-12 times more potent than its corresponding 17,21-dihydroxy compound when tested as an anti-inflammatory agent in the well-known granuloma pouch test, and the 9α-chloro-16α-methyl-17α,21-isopropylidenedioxy-1,4-pregnadiene-11β - ol-3,20-dione 11β-formate is about 16 times more potent than prednisolone when tested as an anti-inflammatory agent in the granuloma pouch test. Also, the 17,21-isopropylidenedioxy derivative of 9α-fluoro-16α-methyl-1,4-pregnadiene-11β,17α,21-triol-3,20-dione shows prolonged and enhanced anti-inflammatory activity and is particularly valuable in topical therapy of inflammatory conditions.

In essence, where the 17α,21-dihydroxy-20-keto steroid is physiologically active and therapeutically useful, its corresponding 17α,21-alkylidenedioxy analog is also valuable. As indicated above, the cyclic grouping enhances effect, provides for longer duration of action and it is particularly useful in topical therapy. My novel therapeutically valuable compounds may be administered in pharmaceutical dosage forms such as creams, ungents, tablets, elixirs and the like. Topical preparations advantageously contain from about 0.1 to about 0.5% of alkylidenedioxy compound. Such preparations are valuable in the alleviation of burns and the treatment of certain atopic and contact dermatoses.

These valuable pregnenes are also useful in the veterinary field, particularly in the treatment of small animals exhibiting inflammatory disorders. In view of their greatly enhanced activity, smaller doses than are usually employed with anti-inflammatory steroids may be used advantageously with the result that hormonal side effects are minimized.

While the aforementioned therapeutic uses are also true of the 4-pregnene of our invention, the 1,4-pregnadienes are by far the more potent. However, the 4-pregnenes while being less potent still have the advantage of being useful as intermediates. For example, upon microbiological dehydrogenation with an organism such as *Corynebacterium simplex* according to known procedures, the 4-pregnenes may be transformed into the more potent 1,4-pregnadienes.

The following examples will serve to typify several preparative routes suitable for our novel compounds. These examples however should not be construed as limiting the scope of this invention, the scope of which is limited only by the appended claims.

EXAMPLE 1

*17α,21-Isopropylidenedioxy-1,4-Pregnadiene-11β-Ol-3,20-Dione*

A solution of 2.0 g. of prednisoline in 4 cc. of dimethylformamide and 15 cc. of 2,2-dimethyoxypropane to which has been added a crystal of p-toluenesulfonic acid is refluxed for 6 hrs. The solvents are then removed in vacuo and the residue dissolved in benzene and absorbed on 40 g. of acid-washed alumina. Elution with benzene and chloroform-benzene 1:2 and crystallization from acetone yield 17α,21-isopropylidenedioxy-1,4-pregnadiene-11β-ol-3,20-dione, M.P. 243–247° C., $[\alpha]_D^{23} + 106°$ (chloroform).

EXAMPLE 2

*17α,21-Isopropylidenedioxy-21-Methyl-1,4-Pregnadiene-11β-Ol-3,20-Dione*

A solution of potassium t-butoxide is prepared from 700 mg. of potassium in 50 cc. of t-butanol and to it is added 1.0 g. of 17α,21-isopropylidenedioxy-1,4-pregnadiene-11β-ol-3,20-dione. After solution has occurred, 15 cc. of methyliodide are added and the mixture is refluxed under a nitrogen atmosphere with stirring for 2 hours. The mixture is poured into water and extracted with chloroform. The chloroform solution is next dried over sodium sulfate and concentrated in vacuo. The residue is then crystallized twice from acetone to yield 17α,21-isopropyl-idenedioxy - 21 - methyl-1,4-pregnadiene-11β-ol-3.20-dione, M.P. 245° $[\alpha]_D^{23} + 93°$ (chloroform).

EXAMPLE 3

*21-Methylprednisolone*

A solution of 612 mg. of 17α,21-isopropylidenedioxy-21-methyl-1,4-pregnadiene,11β-ol-3,20-dione in 10 cc. of acetic acid and 10 cc. of water is heated on a steam bath under a nitrogen atmosphere for 1.5 hours. The solution is then concentrated in vacuo and the residue crystallized from acetic acid and ether and recrystallized from acetic acid to yield 21-methyl-prednisolone, M.P. 129–133°, $[\alpha]_D^{24} + 56°$ (chloroform).

EXAMPLE 4

*21-Methylprednisolone 21-Acetate*

A solution of 100 mg. of 21-methylprednisolone in 1 cc. of pyridine and 1 cc. of acetic anhydride is allowed to stand overnight. The solvents are then removed in vacuo and the residue crystallized twice from acetone-hexane to yield 21-methylprednisolone 21-acetate, M.P. 218–224°, $[\alpha]_D^{24} + 97°$ (chloroform).

EXAMPLE 5

*21-Methylene-17α,21-Isopropylidenedioxy-1,4-Pregnadiene-11β-Ol-3,20-Dione*

To a solution of 3.0 g. of 17α,21-isopropylidenedioxy-1,4-pregnadiene-11β-ol-3,20-dione in 120 cc. of ethanol is added 750 mg. of sodium bicarbonate and 30 cc. of 37% formaldehyde solution. The mixture is stirred at 65–70° for 16 hours and water is then added. The ethanol is next removed in vacuo. The residue is filtered, washed with water, and recrystallized from acetone to yield 21-methylene-17α,21-isopropylidenedioxy-1,4-pregnadiene-11β-ol-3,20-dione, M.P. 213–215°, $[\alpha]_D^{28} + 286°$ (chloroform).

EXAMPLE 6

*9α-Fluoro-16α-Methyl-17α,21-Isopropylidenedioxy-1,4-Pregnadiene-11β-Ol-3,20-Dione*

A solution of 500 mg. of 9α-fluoro-16α-methylprednisolone in 2 cc. of dimethylformamide, 3 cc. of 2,2-dimethoxypropane and 25 mg. of p-toluenesulfonic acid is refluxed for 12 hours. The solution is then concentrated to dryness in vacuo and the residue dissolved in benzene. The insoluble material is removed by filtration. The filtrate is placed on 10 g. of Florisil and eluated with benzene-ether, 1:1. The solid material so obtained is recrystallized thrice from ether-methylene chloride to yield 9α - fluoro - 16α-methyl-17α,21-isopropylidenedioxy-1,4-pregnadiene-11β-ol-3,20-dione, M.P. 263–264°, $[\alpha]_D^{23} + 83°$ (chloroform).

EXAMPLE 7

*9α-Fluoro-16α,21-Dimethyl-17α,21-Isopropylidenedioxy-1,4-Pregnadiene-11β-Ol-3,20-Dione*

To a solution of 290 mg. of potassium of 100 cc. of dry t-butanol are added 802 mg. of 9α-fluoro-16α-methyl- 17α,21 - isopropylidenedioxy-1,4-pregnadiene-11β-ol-3,20-dione. After the steroid is completely dissolved at room temperature, 20 cc. of methyliodide are added and the mixture is stirred at room temperature for 15 minutes under a nitrogen atmosphere. The solution is then poured into water and the mixture extracted with chloroform. The chloroform extracts are dried over sodium sulfate and concentrated to dryness in vacuo. The residue is crystallized from methylene chloride-ether and recrystallized from acetone to yield 9α-fluoro-16α,21-dimethyl-17α,21 - isopropylidenedioxy-1,4-pregnadiene-11β-ol-3,20-dione, M.P. 252–258°, $[\alpha]_D^{31}+72$ (chloroform).

EXAMPLE 8

9α-Fluoro-16α,21-Dimethylprednisolone

A solution of 90 mg. of 9α-fluoro-16α,21-dimethyl-17α,21-isopropylidenedioxy - 1,4 - pregnadiene-11β-ol-3,20-dione in 7 cc. of 50% formic acid is heated for 2 hours on the steam bath under a nitrogen atmosphere. Water is next added and the solution concentrated to dryness in vacuo. The residue is crystallized twice from methylene chloride, and dried in high vacuum at 140° to yield 9α-fluoro - 16α,21 - dimethylprednisolone, M.P. 243–246°, $[\alpha]_D^{29}+79$ (chloroform).

EXAMPLE 9

9α-Fluoro-16α,21-Dimethylprednisolone 21-Acetate

A solution of 350 mg. of 9α-fluoro-16α,21-dimethylprednisolone in 2 cc. of pyridine and 2 cc. of acetic anhydride is allowed to stand overnight. The solvents are then removed in vacuo and the residue crystallized from methanol to yield 9α-fluoro-16α,21-dimethylprednisolone 21-acetate, 150 mg., M.P. 234–240°.

EXAMPLE 10

9α-Fluoro-16α-Methyl-21-Methylene-17α,21-Isopropylidenedioxy-1,4-Pregnadiene-11β-Ol-3,20-Dione To a solution of 250 mg. of 9α-fluoro-16α-methyl-17α,21-isopropylidenedioxy - 1,4 - pregnadiene-11β-ol-3,20-dione in 15 cc. of ethanol and 4 cc. of 37% formaldehyde solution is added 80 mg. of sodium bicarbonate. The mixture is stirred overnight at a bath temperature of 70°. Water is then added and the ethanol removed in vacuo. The residue is filtered, dried and crystallized from acetone, to yield 9α-fluoro-16α-methyl-21-methylene-17α,21 - isopropylidenedioxy-1,4-pregnadiene-11β-ol-3,20-dione, M.P. 228–235°, $[\alpha]_D^{31}+244°$ (chloroform).

EXAMPLE 11

71α,21-Isopropylidenedioxy-21-Benzylidene-1,4-Pregnadiene-11β-Ol-3,20-Dione

To a boiling solution of 2 g. of 17α,21-isopropylidenedioxy-1,4-pregnadiene-11β-ol-3,20-dione in 100 cc. of methanol is added 1 g. of sodium methoxide and 5 cc. of benzaldehyde. The solution is stirred overnight at 50° during which time the gradual precipitation of the benzylidene derivative occurs. To the cooled mixture is added 125 cc. of water and the solid formed collected by filtration. After drying, the material is crystallized from acetone-methanol to yield 17α,21-isopropylidenedioxy-21-benzylidene-1,4-pregnadiene-11β-ol-3,20 - dione, M.P. 289–292°.

EXAMPLE 12

17α,21-Isopropylidenedioxy-12-Nitromethyl-1,4-Pregnadiene-11β-Ol-3,20-Dione

To a solution of 50 mg. of sodium in 20 cc. of methanol is added 412 mg. of 17α,21-isopropylidenedioxy-1,4-pregnadiene-11β-ol-3,20-dione. After heating to bring the steroid into solution, 0.1 cc. of nitromethane in 0.15 cc. of methanol is added dropwise. The solution is refluxed for 15 minutes, cooled and acidified with dilute acetic acid. Further dilution with water precipitates a solid which is collected by filtration and dried. The solid is next dissolved in benzene and adsorbed in 6 g. of Florisil. The benzene-ether, 1:1, fractions affords 17α,21-isopropylidenedioxy - 21 - nitromethyl-1,4-pregnadiene-11β-ol-3,20-dione which is recrystallized from ether, M.P. 225–228°.

EXAMPLE 13

17α,21-Isopropylidenedioxy-1,4-Pregnadiene-3-One-11β,20β-Diol

To a solution of 400 mg. of 17α,21-isopropylidenedioxy-1,4-pregnadiene-11β-ol-3,20-dione in 40 cc. of dimethylformamide is added a solution of 115 mg. of sodium borohydride in 5 cc. of water. The solution is allowed to stand overnight at room temperature, cooled and the excess sodium borohydride decomposed by addition of acetic acid. The solution is next diluted with water and the precipitated solid filtered, dried, and crystallized from acetone to yield 17α,21-isopropylidenedioxy-1,4-pregnadiene-3-one-11β,20β-diol, M.P. 233–237°, $[\alpha]_D+67°$ (chloroform).

EXAMPLE 14

17α,21-(2-Butylidenedioxy)-1,4-Pregnadiene-11β-Ol-3,20-Dione

By substituting 2,2-dimethoxybutane for 2,2-dimethoxypropane in the procedure of Example 1 there is prepared upon purification as therein described, 17α,21-(2-butylidenedioxy)-1,4-pregnadiene-11β-ol-3,20-dione.

In a similar fashion by substituting 2,2-dimethoxypentane, 1,1-dimethoxycyclohexane, 3,3-dimethoxypentane, and the like for 2,2-dimethoxypropane in the procedure of Example 1, there are prepared respectively 17α,21-(2-pentylidenedioxy) - 1,4 - pregnadiene - 11β - ol - 3,20-dione, 17α,21-cyclohexylidenedioxy-1,4-pregnadiene-11β-ol-3-20-dione, 17α,21-(3-pentylidenedioxy)-1,4-pregnadiene-11β-ol-3,20-dione, and the like.

Likewise, various other dialkyl groups may be substituted for methyl in the starting material. Hence, 2,2-diethoxypropane or dipropoxypropane may be employed in place of dimethoxypropane in the first example.

EXAMPLE 15

1,4-Pregnadiene-17α,21-Diol-3,11,20-Trione

A. Two grams of allopregnane-17α,21-diol-3,11,20-trione are treated with 2,2-dimethoxypropane in the manner of Example 1. There is thus prepared upon purification in the prescribed manner, the compound 17α,21-isopropylidenedioxyallopregnane - 17α,21 - diol - 3,11,20-trione.

B. To one gram of 17α,21-isopropylidenedioxyallopregnane-17α,21-diol-3,11,20-trione in 10 cc. of acetic acid is added 0.8 g. of sodium acetate. The mixture is then treated with 0.8 g. of bromine and stirred for 4 hours. Water is next added to precipitate the crude product which is collected by filtration and refluxed without further purification in 50 cc. of dimethyl formamide for one hour. Chloroform and water are next added and the organic layer is separated and washed with water. The organic extracts are then reduced to a residue consisting essentially of 17α,21-isopropylidenedioxy-1,4-pregnadiene-3,11,20-trione which is employed in the next step without purification.

C. The crude material prepared in part B of this example is treated with 10 cc. of acetic acid and 10 cc. of water in the manner of Example 3. There is thus prepared upon purification as therein described, the compound of this example 1,4-pregnadiene-17α,21-diol-3,11,20-trione.

EXAMPLE 16

4-Pregnene-17α,21-Diol-3,11,20-Trione

A. Ten grams of 5-pregnene-3β,17α,21-triol-11,20-dione are treated with 2,2-dimethoxypropane according to the procedure of Example 1 with the quantities therein employed being increased five fold. Upon purification as therein described there is obtained 17α,21-isopropylidenedioxy-5-pregnene-3β-ol-11,20-dione.

B. A mixture of 5 g. of 17α,21-isopropylidenedioxy-5-pregnene-3β-ol-11,20-dione in 20 cc. of toluene and 500 cc. of cyclohexanone containing 2 g. of aluminum isopropoxide is refluxed for 2 hours. At the end of this time the mixture is steam distilled to remove the organic solvents and the residue is then filtered. The solid thus obtained is triturated three times with methylene chloride and the organic extracts are then combined, dried, and evaporated to a solid. The solid is then crystallized from acetone-hexane to yield 17α,21-isopropylidenedioxy-4-pregnene-3,11,20-trione.

C. The compound prepared in part B of this example is heated in 10 cc. of formic acid and 10 cc. of water on a steam bath under a nitrogen atmosphere for 1½ hours. The solution is then concentrated in vacuo and the residue crystallized from acetic acid and ether and recrystallized from acetic acid to yield 4-pregnene-17α,21-diol-3,11,20-trione.

Alternatively the compound of this example may be prepared according to the following procedure wherein the 17α,21-alkylidenedioxy function is also advantageously employed.

Following the procedure of Example 1 with 4-pregnene-11α,17α,21-triol-3,20-dione being substituted for prednisolone and increasing the quantities therein employed 5 fold, there is prepared 17α,21-isopropylidenedioxy-4-pregnene-11α-ol-3,20-dione. This compound is dissolved in 20 cc. of pyridine and treated with a complex consisting of 2 g. of chromium trioxide and 20 cc. of pyridine. The reaction mixture is stirred for 18 hours at room temperature after which time 6 g. of sodium sulfite are added, care being taken to maintain the temperature below 30° C. The mixture is then extracted with methylene chloride and the organic extracts washed with water, dried, and evaporated to a residue. Crystallization of this residue from acetone-hexane yields 17α,21-isopropylidenedioxy-4-pregnene-3,11,20-trione.

This product, 17α,21-isopropylidenedioxy-4-pregnene-3,11,20-trione, is next treated with acetic acid and water in the manner of Example 3 and there is thus obtained upon purification as therein described, 4-pregnene-17α,21-diol-3,11,20-trione.

EXAMPLE 17

2-Methyl-4-Pregnene-11β,17α,21-Triol-3,20-Dione

A. Hydrocortisone is substituted for prednisolone in the procedure of Example 1 with the quantities increased 5 fold and there is thus obtained upon purification in the prescribed manner, 17α,21-isopropylidenedioxy-4-pregnene-11β-ol-3,20-dione.

B. To a solution of 4.4 g. of 17α,21-isopropylidenedioxy-4-pregnene-11β-ol-3,20-dione and 3 cc. of diethyl oxalate in 50 cc. of t-butanol is added 1 g. of sodium methoxide while maintaining the temperature at 50° C. After ½ hour the mixture is cooled and the precipitated solid collected by filtration. This solid is then dissolved in water and then reprecipitated by the careful addition of dilute hydrochloric acid, care being taken to keep the pH above 7. The resulting solid, 2-ethoxyoxalyl-17α,21-isopropylidenedioxy-4-ene-11β-ol-3,20-dione is dissolved in 20 cc. of acetone containing 15 cc. of methyl iodide and 25 g. of anhydrous potassium carbonate and the mixture is stirred for 72 hours. Water is then added and the mixture is next extracted with methylene chloride. The organic extracts are then evaporated to an oily residue consisting essentially of 2-methyl-2-ethoxyoxalyl-17α,21-isopropylidenedioxy-4-pregnene-11β-ol-3,20-dione which is next dissolved in 25 cc. of methanol to which has been added 0.5 g. of sodium methoxide. This mixture is allowed to stand for 4 hours at room temperature after which time the careful addition of water crystallizes the precipitate of 2-methyl-17α,21-isopropylidenedioxy-4-pregnene-11β-ol-3,20-dione. This material is then collected by filtration and treated with acetic acid and water in the manner of Example 3 to yield 2-methyl-4-pregnene-11β,17α,21-triol-3,20-dione.

EXAMPLE 18

17α,21-Isopropylidenedioxy-1,4,9(11)-Pregnatriene-3,20-Dione

Two grams of 1,4,9(11)-pregnatriene-17α,21-diol-3,20-dione are treated with 2,2-dimethoxypropane in the manner of Example 1. There is thus prepared upon purification in the manner therein prescribed, the compound of this example, 17α,21-isopropylidenedioxy-1,4,9(11)-pregnatriene-3,20-dione.

EXAMPLE 19

17α,21-(1-Phenyl-2-Propylidenedioxy)-1,4-Pregnadiene-3,11,20-Trione

One gram of 1,4-pregnadiene-17α,21-diol-3,11,20-trione is dissolved in 15 cc. of benzene and to the solution is added 5 g. of 1-phenyl-2-propanone. A small quantity of anhydrous hydrogen chloride (about 1%) is then introduced and the mixture refluxed employing a Dean-Stark reflux apparatus for the removal of the water which is formed. The mixture is thus heated until water is no longer formed. The solution is then cooled and poured into water and extracted with methylene chloride. The methylene chloride extracts are next washed with water, dried, and evaporated to a residue and the residue chromatographed in the manner described in Example 1. There is thus prepared, 17α,21-(1-phenyl-2-propylidenedioxy)-1,4-pregnadiene-3,11,20-trione.

EXAMPLE 20

6α-Methyl-17α,21-Isopropylidenedioxy-21-Acetyl-1,4-Pregnadiene-3,11,20-Trione

A. 6α-METHYL-17α,21-ISOPROPYLIDENEDIOXY-1,4-PREGNADIENE-3,11,20-TRIONE

Ten grams of 6α-methyl-1,4-pregnadiene-17α,21-diol-3,11,20-trione are treated in the manner of Example 1 with the quantities therein described increased five fold. Upon purification in the prescribed manner there is obtained 6α-methyl - 17α,21 - isopropylidenedioxy-1,4-pregnadiene-3,11,20-trione.

B. 6α-METHYL-17α,21-ISOPROPYLIDENEDIOXY-21-ACETYL-1,4-PREGNADIENE-3,11,20-TRIONE

Three grams of 6α-methyl-17α,21-isopropylidenedioxy-1,4-pregnadiene-3,11,20-trione are added to 15 ml. of ethyl acetate and to the mixture is added a solution prepared from 20 ml. of t-butanol and 280 mg. of potassium metal. The mixture is then heated at reflux temperature with provision made for the removal of the ethanol which is formed. The mixture is thusly heated for three hours, then cooled and poured into water. The water mixture is next extracted with chloroform, dried over sodium sulfate and reduced to a residue. Upon recrystallization of the residue from acetone there is obtained 6α-methyl-17α,21-isopropylidenedioxy-21-acetyl - 1,4 - pregnadiene-3,11,20-trione.

In a similar fashion by substituting 6α-fluoro-1,4-pregnadiene-17α,21-diol-3,11,20-trione in the procedure of Example 20A, there is prepared 6α-fluoro-17α,21-isopropylidenedioxy-1,4-pregnadiene-3,11,20 - trione, which when treated in the manner of Example 20B is converted to 6α-fluoro - 17α,21 - isopropylidenedioxy-21-acetyl-1,4-pregnadiene-3,11,20-trione.

Likewise the esters of various other organic acids may be substituted for ethyl acetate in Example 20B and there may thus be prepared such compounds as 17α,21-isopropylidenedioxy-21-benzoyl-1,4-pregnadiene - 11β - ol-3,20-dione, 9α-fluoro - 17α,21 - isopropylidenedioxy-21- propionyl - 1,4 - pregnadiene-11β-ol-3,20-dione, and 16α-methyl-17α,21-isopropylidenedioxy - 21 - trifluoroacetyl-1,4-pregnadiene-11α-ol-3,20-dione.

EXAMPLE 21

*9α,11β-Dichloro-17α,21-Isopropylidenedioxy-1,4-Pregnadiene-3,20-Dione*

A solution of 2.0 g. of 9α,11β-dichloro-1,4-pregnadiene-17α,21-diol-3,20-dione in 4 ml. of dimethylformamide and 15 ml. of 2,2-dimethoxypropane to which has been added a crystal of p-toluenesulfonic acid is heated at reflux temperature for 10 hrs. The reaction mixture is then concentrated in vacuo and the residue dissolved in benzene. This solution is then placed upon a chromatographic column and eluted with benzene and then with a 2:1 benzene in chloroform solution. The material which is first eluted is recrystallized from acetone to yield the compound of this example 9α,11β-dichloro-17α,21 - isopropylidenedioxy-1,4-pregnadiene-3,20-dione, M.P. 212–214° $[\alpha]_D^{25}+162$ (dioxane).

In a similar manner the following 9α,11β-dihalogeno pregnanes are subjected to the above reaction procedure:

9α-bromo-11β-fluoro-1,4-pregnadiene-17α-21-diol-3,20-dione,
9α-chloro-11β-fluoro-1,4-pregnadiene-17α,21-diol-3,20-dione,
9α,11β-difluoro-1,4-pregnadiene-17α,21-diol-3,20-dione,
9α-fluoro-11β-chloro-4-pregnene-17α,21-diol-3,20-dione,
9α-bromo-11β-fluoro-4-pregnene-17α,21-diol-3,20-dione,
9α-iodo-11β-fluoro-1,4-pregnadiene-17α,21-diol-3,20-dione,
9α,11β-dichloro-4-pregnene-17α,21-diol-3,20-dione.

There is thus prepared respectively the following compounds:

9α-bromo-11β-fluoro-17α,21-isopropylidenedioxy-1,4-pregnadiene-3,20-dione,
9α-chloro-11β-fluoro-17α,21-isopropylidenedioxy-1,4-pregnadiene-3,20-dione,
9a,11β-difluoro-17α,21-isopropylidenedioxy-1,4-pregnadiene-3,20-dione,
9α-fluoro-11β-chloro-17α,21-isopropylidenedioxy-4-pregnene-3,20-dione,
9α-bromo-11β-fluoro-17α,21-isopropylidenedioxy-4-pregnene-17α,21-diol-3,20-dione,
9α-iodo-11β-fluoro-17α,21-isopropylidenedioxy-1,4-pregnadiene-3,20-dione,
9α,11β-dichloro-17α,21-isopropylidenedioxy-4-pregnene-3,20-dione.

EXAMPLE 22

*2-Methyl-9α-Chloro-11β-Fluoro-17α,21-(3-Pentylidenedioxy)-4-Pregnene-3,20-Dione*

To a solution of 2 g. of 2-methyl-9α-chloro-11β-fluoro-4-pregnene-17α,21-diol-3,20-dione in 4 cc. of dimethylformamide is added 15 cc. of 3,3-dimethoxy pentane and a crystal of p-toluenesulfonic acid. The matter is refluxed for 6 hrs. and purified according to the procedure described in Example 21. There is thus obtained the compound of this example, 2-methyl-9α-chloro-11β-fluoro-17α,21-(3-pentylidenedioxy) - 4 - pregnene - 3,20-dione.

Use of 2,2-dimethoxy propane in the above procedure in place of 3,3-dimethoxy pentane results in the formation of 2 - methyl-9α-chloro-11β-fluoro-17α,21-isopropylidenedioxy-4-pregnene-3,20-dione.

EXAMPLE 23

*9α,11β-Dichloro-16α-Methyl-17α,21-Isopropylidenedioxy-1,4-Pregnadiene-3,20-Dione*

9α,11β-dichloro-16α-methyl - 1,4 - pregnadiene-17α,21-diol-3,20-dione is subjected to the reaction as described in Example 21 with the exception that the reflux period is extended to 15 hrs. Upon purification as therein described there is obtained the compound of this example 9α,11β-dichloro-16α-methyl - 17α,21 - isopropylidenedioxy-1,4-pregnadiene-3,20-dione, M.P. 230–235° $[\alpha]_D^{25}+155$ (dioxane).

In a similar fashion, by employing the 16β-methyl epimer, 9α,11β-dichloro-16β-methyl - 1,4 - pregnadiene-17α,21-diol-3,20-dione in the above procedure there is formed 9α,11β-dichloro - 16β - methyl 17α,21-isopropylidenedioxy-1,4-pregnadiene - 3,20 - dione, M.P. 207–212° $[\alpha]_D^{25}+159°$ (dioxane).

Likewise by substituting 9α-bromo-11β-chloro-16α-ethyl-1,4-pregnadiene-17α,21-diol-3,20-dione therein, the compound prepared is 9α-bromo-11β-chloro-16α-ethyl-17α,21-isopropylidenedioxy-1,4-pregnadiene-3,20-dione.

EXAMPLE 24

*6α,9α,11β-Trifluoro-17α,21-Isopropylidenedioxy-Pregnadiene-3,20-Dione*

6α,9α,11β-trifluoro-1,4-pregnadiene - 17α,21 - diol-3,20-dione is refluxed for 12 hrs. with 2,2-dimethoxypropane and p-toluenesulfonic acid according to the procedure of Example 21. There is thus obtained upon purification in the prescribed manner the compound, 6α,9α,11β-trifluoro-17α,21-isopropylidenedioxy-1,4-pregnadiene-3,20-dione.

In the same manner but with the reflux period extended to 15 hrs. 6α-fluoro-9α,11β-dichloro-16β-methyl-1,4-pregnadiene-17α,21-diol-3,20-dione is treated with the above described reagents and there is prepared 6α-fluoro-9α,11β-dichloro-16β-methyl - 17α,21 - isopropylidenedioxy-1,4-pregnadiene-3,20-dione.

EXAMPLE 25

*6α-Methyl-9α,11β-Dichloro-17α,21-Isopropylidenedioxy-1,4-Pregnadiene-3,20-Dione*

Two grams of 6α-methyl-9α,11β-dichloro-1,4-pregnadiene-17α,21-diol-3,20-dione are dissolved in 4 cc. of dimethylformamide and 15 cc. of 2,2-dimethoxypropane and a crystal of p-toluene-sulfonic acid is added. The reaction mixture is refluxed for 6 hrs. The solvents are then removed in vacuo, the residue dissolved in benzene and adsorped on 40 g. of acid washed alumina and the column eluted with benzene and chloroform-benzene 2:1. Recrystallization from acetone of the material so obtained yields 6α-methyl-9α,11β-dichloro-17α,21-isopropylidenedioxy-1,4-pregnadiene-3,20-dione.

In a similar fashion by subjecting 6α-fluoro-9α,11β-dichloro-1,4-pregnadiene-17α,21-diol-3,20-dione to the reaction procedure herein set forth, there is prepared the compound, 6α-fluoro-9α,11β-dichloro-17α,21-isopropylidenedioxy-1,4-pregnadiene-3,20-dione.

EXAMPLE 26

*9α-Chloro-11β-Fluoro-17α,21-Isopropylidenedioxy-21-Methyl-1,4-Pregnadiene-3,20-Dione*

To 50 cc. of t-butanol are added 700 mg. of potassium metal and to the resultant solution of potassium t-butoxide are added 10 g. of 9α-chloro-11β-fluoro-17α,21-isopropylidenedioxy-1,4-pregnadiene-3,20-dione. There are next introduced 15 cc. of methyl iodide and the reaction mixture is then stirred at reflux temperatures under an atmosphere of nitrogen for two hours. The mixture is next poured into water and extracted with chloroform. These extracts are concentrated to a residue in vacuo after being dried over sodium sulfate. Upon recrystallization of the residue from acetone there is obtained, 9α-chloro-11β-fluoro - 17α,21 - isopropylidenedioxy - 21 - methyl - 1,4-pregnadiene-3,20-dione.

By substituting 9α,11β-dichloro-17α,21-isopropylidenedioxy - 1,4 - pregnadiene - 3,20 - dione, 9α,11β - dichloro-16α - methyl - 17α,21 - isopropylidenedioxy - 1,4 - pregnadiene - 3,20 - dione, 9α,11β - difluoro - 17α,21 - isopropylidenedioxy-1,4-pregnadiene-3,20-dione and the like in the above procedure, there are prepared respectively, 9α,11β - dichloro - 17α,21 - isopropylidenedioxy - 21-methyl - 1,4 - pregnadiene - 3,20 - dione, 9α,11β - dichloro - 16α,21 - dimethyl - 17α,21 - isopropylidenedioxy-1,4 - pregnadiene - 3,20 - dione, 9α,11β - difluoro - 17α,21 - isopropylidenedioxy - 21 - methyl - 1,4 - pregnadiene-3,20-dione and the like.

In a similar fashion by employing ethyl iodides, propyl iodide and the like in place of methyl iodide in the above reaction procedure, there are prepared respectively 9α-chloro - 11β - fluoro - 17α,21 - isopropylidenedioxy - 21-ethyl - 1,4 - pregnadiene - 3,20 - dione and 9α - chloro-11β - fluoro - 17α,21 - isopropylidenedioxy - 21 - propyl-1,4-pregnadiene-3,20-dione.

EXAMPLE 27

*9α,11β-Dichloro-17α,21-Isopropylidenedioxy-21-Methylene-1,4-Pregnadiene-3,20-Dione*

Three grams of 9α,11β-dichloro-17α,21-isopropylidenedioxy-1,4-pregnadiene-3,20-dione are dissolved in 120 cc. of ethanol and to the resultant solution is added 750 mg. of sodium bicarbonate and 30 cc. of 37% formaldehyde solution. The reaction mixture is then stirred at 65–70° C. for 16 hours, after which time water is added and the ethanol removed in vacuo. The solid which forms is collected by filtration, washed with water, and recrystallized from acetone to yield 9α,11β-dichloro-17α,21-isopropylidenedioxy - 21 - methylene - 1,4 - pregnadiene-3,20-dione.

In a similar fashion by substituting 9α,11β-dichloro-16α - methyl - 17α,21 - isopropylidenedioxy - 1,4 - pregnadiene - 3,20 - dione; 9α,11β - dichloro - 16β - methyl-17α,21 - isopropylidendioxy - 1,4 - pregnadiene - 3,20-dione; and 6α - methyl - 9α,11β - dichloro - 17α,21 - isopropylidendioxy - 1,4 - pregnadiene - 3,20 - dione, there are prepared from the above procedure the following compounds respectively, 9α,11β-dichloro-16α-methyl-17α,21 - idopropylidenedioxy - 21 - methylene - 1,4 - pregnadiene - 3,20 - dione; 9α,11β - dichloro - 16β - methyl-17α,21 - isopropylidenedioxy - 21 - methylene - 1,4 - pregnadiene - 3,20 - dione; and 6α - methyl - 9α,11β - dichloro - 17α,21 - isopropylidenedioxy - 21 - methylene-1,4-pregnadiene-3,20-dione.

Substitution of other aldehydes in the above procedure results in the formation of the corresponding alkylidene derivatives. For example, by use of butyraldehyde, cyclohexyl acetaldehyde, and acetaldehyde, there are respectively prepared 9α,11β - dichloro - 17α,21 - isopropylidene - 21 - butylidene - 1,4 - pregnadiene - 3,20 - dione; 9α,11β - dichloro - 17α,21 - isopropylidene - 21 (β - cyclohexylethylidene) - 1,4 - pregnadiene - 3,20 - dione; and 9α,11β - dichloro - 17α,21 - isopropylidene - 21 - ethylidene-1,4-pregnadiene-3,20-dione.

EXAMPLE 28

*9α,11β-Dichloro-17α,21-Isopropylidenedioxy-21-Benzylidene-1,4-Pregnadiene-3,20-Dione*

To a solution of 2 g. of 9α,11β-dichloro-17α,21-isopropylidenedioxy-1,4-pregnadiene-3,20-dione in 100 cc. of boiling methanol is added 1 g. of sodium methoxide and 5 cc. of benzaldehyde. The solution is stirred overnight at 50° C. during which time the gradual precipitation of the crude product occurs. At the completion of the reaction period, there is added 125 cc. of water and the solid material present is collected by filtration and dried. Recrystallization from acetone-methanol yields 9α,11β-dichloro-17α,21 - isopropylidenedioxy - 21 - benzylidene - 1,4-pregnadiene-3,20-dione.

EXAMPLE 29

*9α,11β-Dichloro-17α,21-(2-Pentylidenedioxy)-1,4-Pregnadiene-3,20-Dione*

The reaction procedure described in Example 1 is followed with the exception that 2,2-dimethoxypentane is substituted for 2,2-dimethoxypropane. There is thus prepared upon the purification therein described, 9α,11β-dichloro - 17α,21 - (2 - pentylidenedioxy) - 1,4 - pregnadiene-3,20-dione.

In a similar fashion by substituting 1,1-dimethoxy-cyclopentane for 2,2-dimethoxypropane in the procedure of Example 21 there is formed 9α,11β - dichloro - 17α,21-cyclopentylidenedioxy-1,4-pregnadiene-3,20-dione.

EXAMPLE 30

*9α,11β-Dichloro-16-Methylene-17α,21-Isopropylidenedioxy-1,4-Pregnadiene-3,20-Dione*

A. 16β-METHYL-16,17-OXIDO-5-PREGNENE-3β-OL-20-ONE

To a solution of 32 ml. of 50% aqueous sodium hydroxide in 125 ml. of water is added 164 g. of 16-methyl-5,16-pregnadiene-3β-ol-20-one previously dissolved in 500 ml. of chloroform and 1200 ml. of methanol. There is then added 225 ml. of 35% hydrogen peroxide while stirring and keeping the temperature below 25° C. Stirring is continued for 48 hours whereupon the mixture is acidified with acetic acid. There is then added a saturated solution of sodium sulfite sufficient to destroy excess peroxide as determined by an iodide-starch test. The mixture is then steam distilled and the oxido compound of Example 30A is removed by filtration. Purification is effected by recrystallization from acetone, M.P. 188° C., $[\alpha]_D^{25}$—20° (1% in dioxane).

B. 16β-METHYL-16,17-OXIDO-5-PREGNENE-3β-OL-20-ONE 3-ACETATE

To a solution of 167 g. of the compound of Example 30A in 500 ml. of pyridine is added 170 ml. of acetic anhydride. The mixture is stirred at 60° C. overnight. The mixture is then cooled, 3 liters of water are added and the mixture is filtered to yield the acetate compound which is purified by recrystallization from acetone, M.P. 180–182° C., $[\alpha]_D^{25}$—16.7 (1% in dioxane).

C. 16-METHYLENE-5-PREGNENE-3β,17α-DIOL-20-ONE 3-ACETATE

To a solution of 110 g. of the compound of Example 30B in 2.4 liters of acetic acid is added 2.5 g. of hydrogen bromide. The mixture is stirred at 30° C. for a few minutes. The precipitate is removed by filtration, washed with aqueous acetic acid and dried to yield 16-methylene-5-pregnene-3β,17α-diol-20-one 3-acetate, M.P. 200° C., $[\alpha]_D^{25}$—109.5 (1% in dioxane).

D. 16-METHYLENE-5-PREGNENE-3β,17α,21-TRIOL-20-ONE 3,21-DIACETATE

To a solution of 10 g. of the compound of Example 30C in 230 ml. of methylene chloride and 600 ml. of acetic acid, which has been cooled to 5° C., is added with stirring a solution of 4.54 g. of bromine in 75 ml. of acetic acid over a ten minute period. There is then added 2 ml. of a 25% solution of hydrogen bromide in acetic acid followed by the dropwise addition of 4.54 g. of bromine in 75 ml. of acetic acid. After one-half hour, the bromination is completed and the methylene chloride removed by vacuum concentration at 30° C. The acetic acid solution is poured into water thus precipitating the crude 5,6,21-tribromo substituted product.

The tribromo intermediate is dried in vacuo and dissolved in 600 ml. of acetone. There is added 20 g. of pulverized sodium iodide and the mixture is shaken vigorously for 30 minutes at room temperature. There is then added 80 g. of finely ground potassium acetate and the mixture is stirred and refluxed for 6 hours. After this period, the mixture is concentrated to one-half volume, poured into water and extracted four times with chloroform. The chloroform solution is shaken twice with water, dried and concentrated to a residue. The residue is purified by recrystallization from acetone, yielding 16-methylene-5-pregnene-3β,17α,21-triol - 20-one 3,21-diacetate, M.P. 195–197° C., $[\alpha]_D^{25}$—65.7° (chloroform).

E. 16-METHYLENE-4-PREGNENE-17α,21-DIOL-3,20-DIONE

To a sterile nutrient solution of 36 g. of glucose, 9 g. yeast extract, 12 g. ammonium chloride, 6 g. magnesium sulfate heptahydrate, 21 g. disodium hydrogen phosphate is added an inoculum (800 ml.) of a strongly growing culture of *Flavobacterium dehydrogenans* var. *hydrolyticum* (Waksman Collection No. 130). The growth culture is subjected to aeration (800 liters/minute) until there is attained an 80% increase in growth of the organism. There is then added 15 g. of the compound of Example 10D in 50 ml. of dimethylformamide. The formation of the 3-keto-Δ4-system is followed hourly by examination of the U.V. absorption of a test sample (absorption $\lambda_{max}$ at 240 mμ). When optimum transformation has taken place, the broth is extracted four times with 15 liters of chloroform each. The chloroform extracts are combined and evaporated to a residue, the residue is purified by crystallization from acetone, M.P. 207° C., $[\alpha]_D^{25}+47.5$ (chloroform) yielding 16 - methylene-4-pregnene-17α,21-diol-3,20-dione.

F. 16-METHYLENE HYDROCORTISONE

To 15 liters of growth medium consisting of 3% glucose, 1% malt extract, 0.1% yeast extract, 0.2% sodium nitrate, 0.1% potassium dehydrogen phosphate, 0.05% magnesium sulfate heptahydrate and 0.01% ferrous sulfate heptahydrate is added an inoculum of 800 ml. of a culture of *Curvularia lunate* (N.R.R.L. 2380). Growth is permitted to occur at 28° C. while stirring and aerating for 18 hours. There is added 5 g. of 16-methylene-4-pregnene-17α,21-diol-3,20-dione (from Example 10E) when the pH is determined to be about 6.5. Fermentation is continued for 18–30 hours, the course of the reaction determined by paper chromatography. The fermentation broth is processed as in Example 10E. There is obtained 16-methylene hydrocortisone, M.P. 224–225° C., $[\alpha]_D^{25}+69.2$ (dioxane) after recrystallization from acetone.

G. 16-METHYLENEPREDNISOLONE

*Bacillus sphaericus* (A.T.C.C. 7055) is incubated on a nutrient agar (composed of bacto-beef extract, 3 g.; bacto-peptone, 5 g.; sodium chloride, 8 g.; agar 15 g.; tap water, 1 liter) for 24 hours at 28° C. To 5 liters of a sterile nutrient broth (composed of bacto-beef extract, 3 g.; bacto-peptone, 5 g.; per liter of tap water) is added 400 ml. of the shake culture prepared above and the broth mixture is further incubated for 7 hours. There is then asceptically added 1.1 g. of 16-methylene hydrocortisone and fermentation is permitted to occur for an additional 16 hours. The reaction broth is shaken with chloroform and the chloroform extract is steam distilled. The residue is purified by crystallization from acetone yielding 16-methylene-prednisolone, M.P. 210–211° C.

H. 16-METHYLENEPREDNISOLONE 21-ACETATE

To a solution of 0.9 g. of 16-methyleneprednisolone in 5 ml. of pyridine is added 3 ml. of acetic anhydride. The reaction mixture is allowed to stand at room temperature overnight, then is diluted with ice-water. The resulting precipitate is removed by filtration and recrystallized from acetone-hexane yielding 16-methyleneprednisolone 21-acetate.

I. 16-METHYLENE HYDROCORTISONE 21-ACETATE

By following the procedure of Example 30H, but employing 16-methylene hydrocortisone as the starting reactant, there is obtained 16-methylene hydrocortisone 21-acetate.

This substance, when subjected to the dehydrogenation of *Bacillus sphaericus* as described in Example 30G gives rise to the formation of 16-methyleneprednisolone 21-acetate, the compound of Example 30H.

J. 16-METHYLENE-1,4,9(11)-PREGNATRIENE-17α,21-DIOL-3,20-DIONE 21-ACETATE

To a solution of 1 g. of 16-methyleneprednisolone 21-acetate in 15 ml. of anhydrous pyridine at 0° C. is added 1 g. of p-toluenesulfonyl chloride. The reaction mixture is allowed to warm to room temperature and stand overnight. The mixture is then diluted with water and the precipitate removed by filtration and dried. 16-methylene-1,4,9(11)-pregnatriene - 17α,21-diol - 3,20-dione 21-acetate is obtained from crystallization of acetone-hexane.

K. 9α,11β-DICHLORO-16-METHYLENE-1,4-PREGNADIENE-17α,21-DIOL-3,20-DIONE 21-ACETATE

A solution of 1.0 g. of 16-methylene-1,4,9(11)-pregnatriene-17α,21-diol-3,20-dione 21-acetate and 5.0 g. of lithium chloride in 40 ml. of glacial acetic acid is treated with 0.410 g. of N-chlorsuccinimide, followed by 0.104 g. of anhydrous hydrogen chloride dissolved in 2.5 ml. of tetrahydrofuran. The reaction mixture is stirred for 2 hours and poured into ice-water. The crude product is filtered and washed with water to give 1.12 g. of solid material, which is recrystallized from acetone-hexane to give substantially pure 9α,11β-dichloro-16-methylene-1,4-pregnadiene-17α,21-diol-3,20-dione 21-acetate.

L. 9α,11β-DICHLORO-16-METHYLENE-1,4-PREGNADIENE-17α,21-DIOL-3,20-DIONE

One gram of 9α,11β - dichloro-16-methylene-1,4-pregnadiene-17α,21-diol-3,20-dione 21-acetate is refluxed in 10 ml. of methanol containing 0.22 g. of sodium bicarbonate and 1 ml. of water for 10 minutes. The mixture is then neutralized with acetic acid and the solvents removed in vacuo. Extraction of the residue and concentration of the extracts followed by recrystallization from hexane yields 9α,11β-dichloro-16 - methylene - 1,4-pregnadiene-17α,21-diol-3,20-dione.

M. 9α,11β-DICHLORO-16-METHYLENE-17α,21-ISOPROPYLIDENE-DIOXY-1,4-PREGNADIENE-3,20-DIONE

The compound prepared in part L of this example, 9α,11β - dichloro - 16 - methylene - 1,4 - pregnadiene-17α,21-diol-3,20-dione is subjected to the reaction procedure as described in Example 23. There is thus prepared upon purification in the manner therein described, the compound of this example, 9α,11β-dichloro-16-methylene - 17α,21 - isopropylidenedioxy - 1,4 - pregnadiene-3,20-dione.

In a similar fashion, by following the procedure outlined in Example 30 parts A through M but omitting part G, there is prepared 9α,11β-dichloro-16-methylene-17α,21-isopropylidenedioxy-4-pregnene-3,20-dione.

EXAMPLE 31

*9α-Bromo-11β-Fluoro-17α,21-Isopropylidenedioxy-21-Acetyl-1,4-Pregnadiene-3,20-Dione*

Three grams of 9α-bromo-11β-fluoro-17α,21-isopropylidenedioxy-1,4-pregnadiene are added to 15 ml. of ethyl acetate and to the mixture is added a solution prepared from 20 ml. of t-butanol and 280 mg. of potassium metal. The mixture is then heated at reflux temperature with provision made for the removal of ethanol which is formed. The mixture is thus heated for three hours and at the end of this time, cooled and poured into water. The water mixture is next extracted with chloroform, dried over sodium sulfate and reduced to a residue. Upon recrystallization of the residue from acetone, there is obtained 9α-bromo-11β-fluoro-17α,21-isopropylidenedioxy - 21 - acetyl - 1,4 - pregnadiene-3,20-dione.

EXAMPLE 32

*9α-Bromo-17α,21-Isopropylidenedioxy-1,4-Pregnadiene-11β-Ol-3,20-Dione 11β-Acetate*

To a solution of 2.0 g. of 9α-bromo-1,4-pregnadiene-11β,17α,21-triol-3,20-dione 11β-acetate in 4 ml. of dimethylformamide and 15 cc. of 2,2-dimethoxypropane is added a crystal of p-toluenesulfonic acid and the mixture is refluxed for 6 hours. The solvents are next removed in vacuo and the residue dissolved in benzene. The benzene solution is then placed upon a column of 40 g. of acid-washed alumina and eluted with benzene and a 33% solution of chloroform in benzene. The material which is eluted first is recrystallized from acetone to yield 9α - bromo - 17α,21 - isopropylidenedioxy - 1,4-pregnadiene-11β-ol-3,20-dione 11β-acetate.

EXAMPLE 33

*9α-Chloro-17α,21-Isopropylidenedioxy-1,4-Pregnadiene-11β-Ol-3,20-Dione 11β-Formate*

A. 9α-CHLORO-1,4-PREGNADIENE-11β,17α,21-TRIOL-3,20-DIONE 11β-FORMATE

One gram of 9α-chloro-1,4-pregnadiene-11β,17α,21-triol-3,20-dione-11β-formate 21-acetate is suspended in 60 ml. of 0.27 N methanolic perchloric acid and the suspension is stirred for 17 hours at room temperature. Four hundred ml. of water are then added and the resulting mixture filtered. The solid thus collected is dried and recrystallized from acetone-hexane to yield 9α-chloro-1,4 - pregnadiene - 11β,17α,21 - triol - 3,20 - dione 11β-formate.

B. 9α-CHLORO-17α,21-ISOPROPYLIDENEDIOXY-1,4-PREGNADIENE-11β-OL-3,20-DIONE 11β-FORMATE

The compound prepared in part A of this example is subjected to the reaction procedure as described in Example 32. There is thus prepared upon purification in the prescribed manner, 9α-chloro-17α,21-isopropylidenedioxy-1,4-pregnadiene-11β-ol-3,20-dione 11β-formate.

EXAMPLE 34

*9α-Chloro-17α,21-Isopropylidenedioxy-1,4-Pregnadiene-11β-Ol-3,20-Dione 11β-Acetate*

9α - chloro - 1,4 - pregnadiene - 11β - 17α,21 - triol-3,20-dione 11,21-diacetate is substituted for 9α-chloro-1,4-pregnadiene - 11β,17α,21 - triol - 3,20 - dione - 11β-formate 21-acetate in Example 33 and upon execution of the procedure therein described there is obtained the compound 9α - chloro - 17α,21 - isopropylidenedioxy-1,4-pregnadiene-11β-ol-3,20-dione 11β-acetate.

EXAMPLE 35

*9α-Chloro-16α-Methyl-17α,21-Isopropylidenedioxy-1,4-Pregnadiene-11β-Ol-3,20-Dione 11β-Formate*

A. 9α-CHLORO-16α-METHYL-1,4-PREGNADIENE-11β,17α,21-TRIOL-3,20-DIONE-11β-FORMATE 21-ACETATE

To a stirred solution of 1.0 g. of 16α-methyl-1,4,9(11)-pregnatriene-17α,21-diol-3,20-dione 21-acetate in 40 ml. of formic acid containing 4.0 g. of sodium formate are added 382 mg. of N-chlorosuccinimide followed immediately by 2.7 ml. of 1 N hydrochloric acid. The mixture is stirred for 3 hours at room temperature and then poured into 400 ml. of water. The solid is then collected by filtration, washed with water, dried, and crystallized from acetone to yield 9α-chloro-16α-methyl-1,4 - pregnadiene - 11β,17α,21 - triol - 3,20 - dione - 11β-formate 21-acetate.

B. 9α-CHLORO-16α-METHYL-1,4-PREGNADIENE-11β,17α,21-TRIOL-3,20-DIONE 11β-FORMATE

The product formed in part A of this example is subjected to the hydrolysis procedure as described in part A of Example 33. There is thus prepared upon purification in the manner therein described, 9α-chloro-16α-methyl - 1,4 - pregnadiene - 11β,17α,21 - triol - 3,20-dione 11β-formate.

C. 9α-CHLORO-16α-METHYL - 17α,21 - ISOPROPYLIDENEDIOXY-1,4-PREGNADIENE-11β-OL-3,20-DIONE 11β-FORMATE

The compound prepared in part B of this example, 9α - chloro - 16α - methyl - 1,4 - pregnadiene - 11β,17α,21-triol-3,20-dione 11β-formate, is treated with 2,2-dimethoxypropane in the manner described in Example 32 with the reaction time extended to 15 hours. Purification in the manner therein prescribed yields the compound of this example, 9α-chloro-16α-methyl-17α,21-isopropylidenedioxy - 1,4 - pregnadiene - 11β - ol - 3,20-dione 11β-formate.

In a similar manner by starting with the 16β-epimer, 16β - methyl - 1,4,9(11) - pregnatriene - 17α,21 - diol-3,20-dione 21-acetate and following the procedure in parts A, B and C of this example there is formed 9α-chloro - 16β - methyl - 17α,21 - isopropylidenedioxy-1,4-pregnadiene-11β-ol-3,20-dione 11β-formate.

Likewise the higher alkyl analogs of the compound of this example are prepared by substitution of the appropriate 16-alkyl-pregnatriene. There is thus prepared, 9α - chloro - 16α - ethyl - 17α,21 - isopropylidenedioxy-1,4-pregnadiene-11β-ol-3,20-dione 11β-formate.

EXAMPLE 36

*9α-Iodo-17α,21-Cyclohexylidenedioxy-4-Pregnene-11β-Ol-3,20-Dione 11β-Acetate*

A. 9α-IODO-4-PREGNENE-11β,17α,21-TRIOL-3,20-DIONE 11β,21-DIACETATE

To a stirred solution of 5.0 g. of 4,9(11)-pregnadiene-17α,21-diol-3,20-dione 21-acetate in 200 ml. of glacial acetic acid is first added 20 g. of lithium acetate and then 3.3 g. of N-iodo-succinimide. The mixture is stirred for 17 hours at room temperature and then poured into 1000 ml. of water. The solid is collected by filtration, washed, dried, and crystallized from ethyl acetate to yield 9α - iodo - 4 - pregnene - 11β,17α,21 - triol - 3,20-dione 11β,21-diacetate.

B. 9α-IODO-4-PREGNENE-11β,17α,21-TRIOL-3,20-DIONE 11β-ACETATE

The product of part A of this example is treated with perchloric acid in the manner of Example 33A. There is obtained upon purification by the method therein described, 9α - iodo - 4 - pregnene - 11β,17α,21 - triol - 3,20-dione 11β-acetate.

C. 9α-IODO-17α,21-CYCLOHEXYLIDENEDIOXY-4-PREGNENE-11β-OL-3,20-DIONE 11β-ACETATE

A solution of 2.0 g. of 9α-iodo-4-pregnene-11β,17α,21-triol-3,20-dione 11β-acetate in 4 cc. of dimethylformamide and 15 cc. of 1,1-dimethoxycyclohexane to which a crystal of p-toluene-sulfonic acid has been added, is refluxed for 10 hours. The solvents are removed in vacuo and the residue chromatographed in the manner described in Example 32. There is thus prepared, 9α-iodo-17α,21-cyclohexylidenedioxy - 4 - pregnene - 11β - ol - 3,20 - dione 11β-acetate.

EXAMPLE 37

*9α-Bromo-17α,21-(3-Pentylidenedioxy)-1,4-Pregnadiene-11β-Ol-3,20-Dione 11β-Diethylacetate*

9α-bromo-1,4-pregnadiene-11β,17α,21 - triol - 3,20-dione 11β-diethylacetate is subjected to the reaction procedure of Example 32 with 3,3-dimethoxypentane substituted for 2,2-dimethoxypropane. There is thus obtained upon purification in the prescribed manner the compound, 9α-bromo-17α,21-(3-pentylidenedioxy)-1,4 - pregnadiene-11β-ol-3,20-dione 11β-diethylacetate.

EXAMPLE 38

*2-Methyl-9α-Chloro-17α,21-(2-Butylidenedioxy)-4-Pregnene-11β-Ol-3,20-Dione 11β-Trifluoroacetate*

To a stirred solution of 1.0 g. of 2-methyl-4,9(11)- pregnadiene-17α,21-diol-3,20-dione 21-acetate in 200 ml. of tetrahydrofuran and 20 ml. of trifluoroacetic acid is added 400 mg. of N-chloroacetamide. The temperature is maintained at 25° C. and stirring is continued for three hours. At the end of this time the mixture is poured into 400 ml. of water, filtered, dried, and recrystallized from acetone-hexane to yield 2-methyl-9α-chloro-4-pregnene-11β,17α,21-triol-3,20-dione 11β-trifluoroacetate 21-acetate.

This compound is then selectively hydrolyzed in the manner of Example 33A to obtain the corresponding 21-alcohol, 2-methyl-9α-chloro-4-pregnene-11β,17α,21-triol-3,20-dione 11β-trifluoroacetate.

This compound is then subjected to the reaction procedure described in Example 32 with the exception that 2,2-dimethoxybutane is substituted for 2,2-dimethoxypropane. There is thus prepared the compound of this example, 2-methyl-9α-chloro-17α,21-(2-butylidenedioxy)-4-pregnene-11β-ol-3,20-dione 11β-trifluoroacetate.

EXAMPLE 39

*9α-Chloro-17α,21-Isopropylidenedioxy-21-Methylene-1,4-Pregnadiene-11β-Ol-3,20-Dione 11β-Formate*

A. 17α,21-ISOPROPYLIDENEDIOXY-1,4,9(11)-PREGNATRIENE-3,20-DIONE

This intermediate is prepared as in Example 18.

B. 21-METHYLENE-1,4,9(11)-PREGNATRIENE-17α, 21-DIOL-3,20-DIONE 21-ACETATE

To a solution of 3.0 g. of 17α,21-isopropylidenedioxy-1,4,9(11)-pregnatriene-3,20-dione in 120 ml. of ethanol are added 750 mg. of sodium bicarbonate and 30 ml. of 37% formaldehyde solution. The mixture is then heated at 65–70° C. with stirring for a period of 16 hours, and at the end of this time water is added and the ethanol removed in vacuo. The mixture is next filtered and the solid thus collected washed well with water.

This material is then added without further purification to 30 ml. of 50% acetic acid, and the mixture is heated at steam bath temperatures under a nitrogen atmosphere for 2 hours. The mixture is then concentrated to dryness in vacuo and the residue crystallized from acetone to yield 21-methylene-1,4,9(11)-pregnatriene-17α,21-diol-3,20-dione.

This material, 21-methylene-1,4,9(11)-pregnatriene-17α,21-diol-3,20-dione, is dissolved in 1 ml. of pyridine and to the mixture is added 1 ml. of acetic anhydride. The mixture is allowed to stand overnight, and the solids are then removed in vacuo and the residue recrystallized from acetone-hexane to yield 21-methylene-1,4,9(11)-pregnatriene-17α,21-diol-3,20-dione 21-acetate.

C. 9α-CHLORO-21-METHYLENE-1,4-PREGNADIENE-11β, 17α,21-TRIOL-3,20-DIONE 11β-FORMATE 21-ACETATE

By subjecting the compound prepared in part B of this example, 21-methylene-1,4,9(11)-pregnatriene-17α,21-diol-3,20-dione 21-acetate, to the reaction procedure as described in Example 35A, there is prepared upon purification as therein described 9α-chloro-21-methylene-1,4-pregnadiene-11β,17α,21-triol-3,20-dione 11β-formate 21-acetate.

D. 9α-CHLORO-21-METHYLENE-1,4-PREGNADIENE-11β,17α,21-TRIOL-3,20-DIONE 11β-FORMATE

The compound prepared in part C of this example is subjected to the selective hydrolysis procedure as set forth in Example 35B, and there is thus formed 9α-chloro-21-methylene-1,4-pregnadiene-11β,17α,21-triol-3,20-dione 11β-formate.

E. 9α-CHLORO-17α,21-ISOPROPYLIDENEDIOXY-21-METHYLENE-1,4-PREGNADIENE-11β-OL-3,20-DIONE 11β-FORMATE

The product of part D of this example, 9α-chloro-21-methylene-1,4,9(11)-pregnatriene-11β,17α,21-triol-3,20-dione 11β-formate, is treated with 2,2-dimethoxypropane in the manner described in Example 32. Upon purification in the manner therein described, there is obtained the compound of this example, 9α-chloro-17α,21-isopropylidenedioxy-21-methylene-1,4-pregnadiene-11β-ol-3,20-dione 11β-formate.

EXAMPLE 40

*9α-Chloro-17α,21-Isopropylidenedioxy-21-Methyl-1,4-Pregnadiene-11β-Ol-3,20-Dione 11β-Formate*

To a solution of 700 mg. of potassium in 50 ml. t-butanol, is added 1.0 g. of 17α,21-isopropylidenedioxy-1,4,9(11)-pregnatriene-3,20-dione. After solution has occurred there is added 15 ml. of methyl iodide, and the solution is refluxed under an atmosphere of nitrogen for 2 hours. At the end of this time the mixture is poured into water and extracted with chloroform, the chloroform extracts being dried over sodium sulfate and then concentrated to a residue in vacuo. The residue is then crystallized from acetone to yield 17α,21-isopropylidenedioxy-21-methyl-1,4,9(11)-pregnatriene-3,20-dione. The alkylidenedioxy group is then cleaved and the resulting free diol esterified according to the procedure described in Example 39B. The remaining procedure described in Example 39, parts C–E is then followed as therein described and there is thus prepared the compound of this example, 9α-chloro-17α,21-isopropylidenedioxy-21-methyl-1,4-pregnadiene-11β-ol-3,20-dione 11β-formate.

EXAMPLE 41

*9α-Chloro-16α,21-Dimethyl-17α,21-Isopropylidenedioxy-1,4-Pregnadiene-11β-Ol-3,20-Dione 11β-Formate*

A. 16α-METHYL-17α,21-ISOPROPYLIDENEDIOXY-1,4,9(11)-PREGNATRIENE-3,20-DIONE

Following the procedure as described in Example 32 with 16α-methyl-1,4,9(11)-pregnatriene-17α,21-diol-3,20-dione being substituted for the steroid therein employed as the starting material and by extending the reaction period to 15 hours, there is prepared upon purification in the prescribed manner, 16α-methyl-17α,21-isopropylidenedioxy-1,4,9(11)-pregnatriene-3,20-dione.

B. 9α-CHLORO - 16α,21 - DIMETHYL-17α,21-ISOPROPYLIDENEDIOXY - 1,4 - PREGNADIENE - 11β-OL-3,20-DIONE 11β-FORMATE

The compound prepared in part A of this example, 16α-methyl-17α,21-isopropylidenedioxy - 1,4,9(11) - pregnatriene-3,20-dione, is subjected to the reaction procedure as described in Example 9, and there is thus formed the compound of this example, 9α-chloro-16α,21-dimethyl-17α,21-isopropylidenedioxy-1,4-pregnadiene-11β - ol-3,20-dione 11β-formate.

EXAMPLE 42

*9α-Chloro-17α,21-Isopropylidenedioxy-16-Methylene-1,4-Pregnadiene-11β-Ol-3,20-Dione 11β-Formate*

One gram of 16-methylene-1,4,9(11)-pregnatriene-17α,21-diol-3,20-dione 21-acetate is treated with formic acid, sodium formate, and N-chloro-succinimide according to the procedure of Example 35A. The compound obtained upon purification is next subjected to the procedures described in parts B and C of Example 35 and there is thus prepared upon purification in the prescribed manner, the compound of this example, 9α-chloro-17α,21-isopropylidenedioxy-16-methylene-1,4 - pregnadiene - 11β-ol-3,20-dione 11β-formate.

EXAMPLE 43

*6α,21-Dimethyl-9α-Bromo-17α,21-Isopropylidenedioxy-4-Pregnene-11β-Ol-3,20-Dione 11β-Propionate*

A. 6α-METHYL-17α,21-ISOPROPYLIDENEDIOXY-4,9(11)-PREGNADIENE-3,20-DIONE

Five grams of 6α-methyl-4,9(11)-pregnadiene-17α,21-diol-3,20-dione are dissolved in 10 ml. of dimethylformamide and 35 ml. of 2,2-dimethoxypropane, and to the resultant solution is added a crystal of p-toluenesulfonic acid. The mixture is refluxed for six hours, the solvents then removed in vacuo and the residue dissolved in benzene. The benzene solution is then placed upon a chromatographic column comprising 100 g. of alumina and eluted with benzene followed by a 33% chloroform in benzene solution. The material which is first eluted is recrystallized from acetone to yield 6α-methyl-17α,21-isopropylidenedioxy-4,9(11)-pregnadiene-3,20-dione.

B. 6α,21-DIMETHYL-17α,21-ISOPROPYLIDENEDIOXY-4,9(11)-PREGNADIENE-3,20-DIONE

Seven hundred milligrams of potassium are dissolved in 50 ml. of t-butanol and to the solution is added 1.0 g. of 6α-methyl-17α,21-isopropylidenedioxy-4,9(11)-pregnadiene-3,20-dione. After solution is complete there is added 15 ml. of methyl iodide and the solution is refluxed under an atmosphere of nitrogen for two hours. The mixture is then poured into water and extracted with chloroform. These extracts are dried over sodium sulfate, reduced to a residue and the residue recrystallized from acetone to yield 6α,21-dimethyl-17α,21-isopropylidenedioxy-4,9(11)-pregnadiene-3,20-dione.

C. 6α,21-DIMETHYL-9α-BROMO-17α,21-ISOPROPYLIDENEDIOXY - 4 - PREGNENE-11β-OL-3,20-DIONE 11β-PROPIONATE

One gram of 6α,21-dimethyl-17α,21-isopropylidenedioxy-4,9(11)-pregnadiene-3,20-dione is dissolved in 50 ml. of propionic acid to which has been added 5 g. of sodium propionate, and there is then added 385 mg. of N-bromoacetamide. The mixture is stirred for four hours and then poured into 400 ml. of water. The solid thus formed is collected by filtration, washed well with water and dried.

The dried crude product thus obtained is treated without further purification with 2 ml. of dimethylformamide, 15 ml. of 2,2-dimethoxypropane and a crystal of p-toluenesulfonic acid. The mixture is treated according to the procedure of Example 32 and there is thus prepared upon purification in the prescribed manner, 6α,21-dimethyl - 9α - bromo - 17α,21 - isopropylidenedioxy-4-pregnene-11β-ol-3,20-dione 11β-propionate.

The following compounds are subjected to the above procedure:

6α-methyl-1,4,9(11)-pregnatriene-17α,21-diol-3,20-dione,
6β-methyl-1,4,9(11)-pregnatriene-17α,21-diol-3,20-dione,
6α-fluoro-4,9(11)-pregnadiene-17α,21-diol-3,20-dione and
6α-fluoro-1,4,9(11)-pregnatriene-17α,21-diol-3,20-dione.

There are thus prepared:

6α,21-dimethyl-9α-bromo-17α,21-isopropylidenedioxy-1,4-pregnadiene-11β-ol-3,20-dione 11β-propionate,
6β,21-dimethyl-9α-bromo-17α,21-isopropylidenedioxy-1,4-pregnadiene-11β-ol-3,20-dione-11β-propionate,
6α-fluoro-9α-bromo-17α,21-isopropylidenedioxy-21-methyl-4-pregnene-11β-ol-3,20-dione 11β-propionate, and
6α-fluoro-9α-bromo-17α,21-isopropylidenedioxy-21-methyl-1,4-pregnadiene-11β-ol-3,20-dione 11β-propionate.

In a similar fashion by omitting part B of this example but following parts A and C, there are prepared from the above recited starting materials, the compounds:

6α-methyl-9α-bromo-17α,21-isopropylidenedioxy-1,4-pregnadiene-11β-ol-3,20-dione 11β-propionate,
6β-methyl-9α-bromo-17α,21-isopropylidenedioxy-1,4-pregnadiene-11β-ol-3,20-dione 11β-propionate,
6α-fluoro-9α-bromo-17α,21-isopropylidenedioxy-4-pregnene-11β-ol-3,20-dione 11β-propionate, and
6α-fluoro-9α-bromo-17α,21-isopropylidenedioxy-1,4-pregnadiene-11β-ol-3,20-dione 11β-propionate.

EXAMPLE 44

21-(1,2-Ethylene)-Prednisolone 17α,21-Acetonide

To a solution of 1.46 g. of 21-methyleneprednisolone-17α,21-acetonide in 50 ml. of dry tetrahydrofuran was added a dry ethereal solution of diazomethane, prepared from 6.0 g. of nitrosomethylurea in the standard fashion. The solution was allowed to stand for 60 hours at 0–5° C. The solvent was removed at reduced pressure and the crystalline residue was recrystallized from acetone to afford 885 mg. of 21-(1,2-ethylene)-prednisolone 17α,21-acetonide, M.P. 242–249°. Further recrystallizations from acetone yielded the analytical sample, M.P. 248–250°;

$$\lambda_{max.}^{MeOH} \ 241 \ m\mu, \ \epsilon = 17,800$$

*Anal.*—Calcd. for $C_{26}H_{34}O_5$: C, 73.21; H, 8.04. Found: C, 73.08; H, 7.92.

EXAMPLE 45

21-(1,2-Ethylene)-Prednisolone

A solution of 185 mg. of 21-(1,2-ethylene) prednisolone 17α,21-acetonide in 20 ml. of 60% aqueous acetic acid is heated on a steam bath under a nitrogen atmosphere for 2 hours. The solution is then concentrated in vacuo and the residue chromatographed on a Chromosorb W (Johns-Manville) partition column using a propylene glycol-toluene system to yield 21-(1,2-ethylene)-prednisolone, M.P. 240–245° C.

$$\lambda_{max.}^{MeOH} \ 241 \ m\mu \ (15,000) \ \lambda_{max.}^{Nujol} \ 2.8, \ 2.98, \ 5.82, \ 6.00, \ 6.16 m\mu$$

EXAMPLE 46

21-(1,2-Ethylene) Dexamethasone-17α,21-Acetonide

To a solution of 450 mg. of 21-methylene dexamethasone-17α,21-acetonide in 10 ml. of tetrahydrofuran was added a dry ethereal solution (30 ml.) of diazomethane, prepared in the usual manner from 1.5 g. of nitrosomethylurea. The solution was allowed to stand for 40 hours at room temperature. The solution was evaporated to dryness under reduced pressure and the residue crystallized from acetone to yield 263 mg. of 21-(1,2-ethylene) dexamethasone-17α,21-acetonide, M.P. 295–300°. The analytical sample was prepared by three recrystallizations from acetone, M.P. 301–303° (dec.), $[\alpha]_D(CHCl_3)+19$;

$$\lambda_{max.}^{MeOH} \ -237 \ m\mu, \ \epsilon = 17,000$$

*Anal.*—Calcd. for $C_{27}H_{35}O_5F$: C, 70.4; H, 7.60. Found: C, 70.23; H, 7.44.

EXAMPLE 47

21-(1,2-Ethylene) Dexamethasone

A solution of 185 mg. of 21-(1,2-ethylene) dexamethasone-17α,21-acetonide in 20 ml. of 60% aqueous acetic acid is heated on a steam bath under a nitrogen atmosphere for 2 hours. The solution is then concentrated in vacuo and the residue chromatographed on a Chromosorb W (Johns-Manville) partition column using a propylene glycol-toluene system to yield 21-(1,2-ethylene) dexamethasone.

In a manner analogous to Examples 44 and 46 other 21-(1,2-ethylene) steroidal 17α,21-acetonides may be produced which in turn when treated in a manner analogous to that of Examples 45 and 47 will yield the corresponding 21-(1,2-ethylene) steroidal compounds.

Various changes and modifications may be made in carrying out the present invention without departing from the spirit and scope thereof. Insofar as these changes and modifications are within the purview of the annexed claims, they are to be considered as part of this invention.

I claim:
1. A compound of the group consisting of pregnadienes having one of the structural formulae:

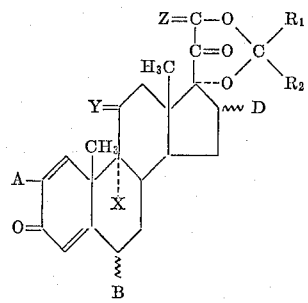

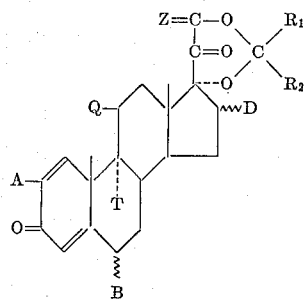

and the 1,2-dihydro analogs thereof, wherein Z is a member of the group consisting of $H_2$, (H, lower alkyl), (H, lower alkanoyl), lower alkylene, lower alkylidene, benzylidene, and cyclohexyl lower alkylidene, $R_1$ is a member of the group consisting of H and lower alkyl and $R_2$ is a member of the group consisting of lower alkyl, phenyl, phenyl-lower alkyl, and that group which is formed by $R_1$ and $R_2$ together with the carbon atom to which both are attached consisting of cyclohexylidene and cyclopentylidene, A is a member of the group consisting of hydrogen and methyl, B is a member of the group consisting of hydrogen, methyl and halogen, D is a member of the group consisting of hydrogen, lower alkyl and lower alkylidene, X is a member of the group consisting of hydrogen and halogen, Y is a member of the group consisting of keto, (H,OH) and (H, lower alkanoyloxy), and Q and T are halogen.

2. 17α,21-isopropylidenedioxy - 21 - methyl - 1,4 - pregnadiene-11β-ol-3,20-dione.
3. 21-methylene - 17α,21 - isopropylidenedioxy-1,4-pregnadiene-11β-ol-3,20-dione.
4. 9α-fluoro - 16 - methyl-17α,21-isopropylidenedioxy-1,4-pregnadiene-11β-ol-3,20-dione.
5. 9α-fluoro - 16α,21 - dimethyl-17α,21-isopropylidenedioxy-1,4-pregnadiene-11β-ol-3,20-dione.

6. The compound having the structural formula:

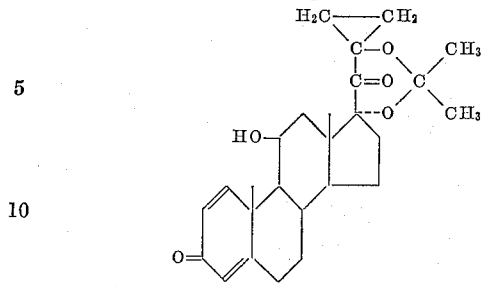

7. The compound having the structural formula:

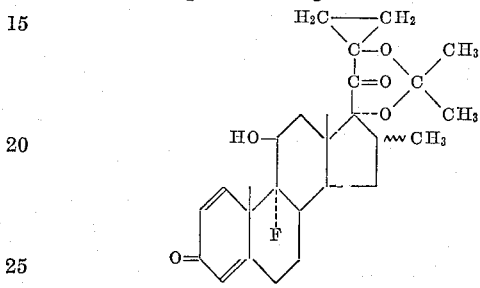

8. 9α,11β-dihalogeno - 16 - methyl-17α,21-lower alkylidenedioxy-1,4-pregnadiene-3,20-dione.
9. 9α,11β-dichloro - 16α - methyl - 17α,21 - ispropylidenedioxy-1,4-pregnadiene-3,20-dione.
10. 9α-11β-dichloro - 16β - methyl - 17α,21 - isopropylidenedioxy-1,4-pregnadiene-3,20-dione.
11. 9α-chloro - 17α,21 - isopropylidenedioxy-1,4-pregnadiene-11β-ol-3,20-dione 11β-formate.
12. 9α-chloro - 16 - methyl-17α,21 - isopropylidenedioxy-1,4-pregnadiene-11β-ol-3,20-dione 11β-formate.
13. The process which comprises treating a 17α-21-dihydroxy-20-keto compound of the pregnane series with a reactant of the formula:

wherein $R_1$ is a member of the group consisting of H and lower alkyl and $R_2$ is a member of the group consisting of lower alkyl, phenyl, phenyl-lower alkyl, and that group which is formed by $R_1$ and $R_2$ together with the carbon atom to which both are attached consisting of cyclohexylidene and cyclopentylidene, and P is a member of the group consisting of O and bis-lower alkoxy, in the presence of a strong acid, the acid being one having a $-\log K$ of less than 2.25.
14. The process of claim 13, wherein the reaction is effected in an inert solvent at about the reflux temperature of the reaction mixture.
15. The process of claim 13, wherein the acid is p-toluenesulfonic acid.
16. The process of claim 14, wherein the reaction is effected in the presence of p-toluenesulfonic acid and the reactant is 2,2-bis-methoxypropane.

References Cited in the file of this patent

Tanabe et al. J.A.C.S. 83, 756–757 (February 1961).
Gardi et al. Tetrahedron Letters No. 13, pp. 448–451 (August 1961).
Robinson et al.: J. Org. Chem. 26, 2863–67 (Aug. 14, 1961).